US012646140B2

(12) United States Patent
Liu et al.

(10) Patent No.: US 12,646,140 B2
(45) Date of Patent: Jun. 2, 2026

(54) FOLDABLE ELECTRONIC DEVICE AND DISPLAY METHOD FOR FOLDABLE SCREEN

(71) Applicant: HUAWEI TECHNOLOGIES CO., LTD., Shenzhen (CN)

(72) Inventors: Mengdi Liu, Beijing (CN); Jing Zhang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/729,172

(22) PCT Filed: Jul. 14, 2023

(86) PCT No.: PCT/CN2023/107506
§ 371 (c)(1),
(2) Date: Jul. 16, 2024

(87) PCT Pub. No.: WO2024/022135
PCT Pub. Date: Feb. 1, 2024

(65) Prior Publication Data
US 2025/0182240 A1      Jun. 5, 2025

(30) Foreign Application Priority Data

Jul. 26, 2022    (CN) .......................... 202210886321.0

(51) Int. Cl.
*G06T 3/40*      (2024.01)
*G06T 11/60*      (2026.01)

(52) U.S. Cl.
CPC ................ *G06T 3/40* (2013.01); *G06T 11/60* (2013.01); *G06T 2200/24* (2013.01); *G06T 2210/32* (2013.01)

(58) Field of Classification Search
CPC . G06T 11/60; G06T 2200/24; G06T 2210/32; G06T 3/40; G04G 9/00; G04G 9/0064; G04G 9/007; G06F 3/147; G06F 9/451
See application file for complete search history.

(56) References Cited

U.S. PATENT DOCUMENTS

2022/0107821 A1* 4/2022 Zhu ........................ G06F 3/0346
2022/0269379 A1* 8/2022 Jiang ................... G06F 3/04845
2022/0269515 A1* 8/2022 Chen ................... G06F 3/04855
2024/0073313 A1* 2/2024 Chen ................... H04M 1/0214

FOREIGN PATENT DOCUMENTS

CN          110597510 A      12/2019
CN          112114912 A      12/2020

* cited by examiner

*Primary Examiner* — Sing-Wai Wu

(57) ABSTRACT

A foldable electronic device and a display method are provided for a foldable screen. The method provides for an electronic device to obtain, in an unfolded state, a first height and a first width of a set interface element, and determine whether the first height is qualified, that is, determines whether a ratio of the first height to a screen height is not greater than a threshold. When the first height is qualified, the interface element having the first height is displayed, and when the first height is unqualified, the electronic device adjusts the first height to obtain a second height and displays the interface element having the second height to provide an adaptive display of screen content for the electronic device.

20 Claims, 28 Drawing Sheets

Surface B

100A

Surface D

Surface A

100B

Surface C

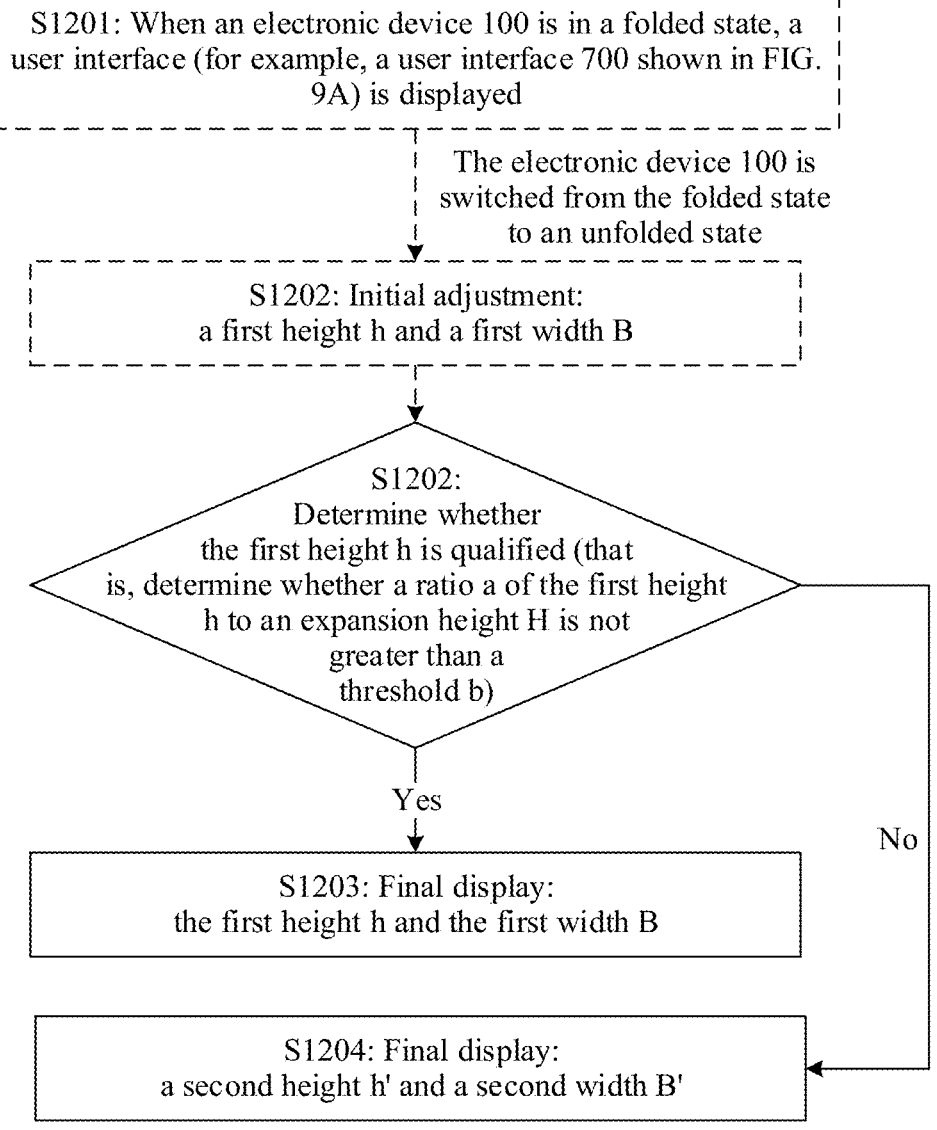

S1201: When an electronic device 100 is in a folded state, a user interface (for example, a user interface 700 shown in FIG. 9A) is displayed The electronic device 100 is switched from the folded state to an unfolded state S1202: Initial adjustment: a first height h and a first width B S1202: Determine whether the first height h is qualified (that is, determine whether a ratio a of the first height h to an expansion height H is not greater than a threshold b)

Yes

No

S1203: Final display: the first height h and the first width B

S1204: Final display: a second height h' and a second width B'

FIG. 12

FOLDABLE ELECTRONIC DEVICE AND DISPLAY METHOD FOR FOLDABLE SCREEN

CROSS-REFERENCE TO RELATED APPLICATIONS

This application is a National Stage of International Application No. PCT/CN2023/107506 filed on Jul. 14, 2023, which claims priority to Chinese Patent Application No. 202210886321.0 filed on Jul. 26, 2022. Both of the aforementioned applications are hereby incorporated by reference in their entireties.

TECHNICAL FIELD

Embodiments of this application relate to the field of terminal technologies, and in particular, to a foldable electronic device and a display method for a foldable screen.

BACKGROUND

A foldable screen of an electronic device can meet a large screen requirement of a user in an unfolded state, and can also reduce a size in a folded state to meet a portable requirement. Therefore, the foldable screen is widely used. However, when a form of the foldable screen of the electronic device changes (for example, switching from the unfolded state to the folded state or switching from the folded state to the unfolded state), how to better implement adaptive display of screen content of the electronic device is a problem that a person skilled in the art has been studying.

SUMMARY

This application provides a foldable electronic device and a display method for a foldable screen, to avoid a phenomenon of a large font and a large image, and effectively reduce a phenomenon that a page information amount in an unfolded state of the electronic device is less than that in a folded state. This provides good user experience.

According to a first aspect, this application provides a display method for a foldable screen. The method includes: An electronic device may obtain a first height and a first width that are of an interface element on a first interface and that are set in an unfolded state, where the first height and the first width are determined based on a height and a width of the interface element in a folded state of the electronic device. The electronic device determines whether a ratio of the first height to a screen height is greater than a first threshold. If the ratio is greater than the first threshold, the height of the interface element is adjusted to a second height, where a ratio of the second height to the screen height is not greater than the first threshold. The electronic device obtains a second width based on the second height. The electronic device displays the first interface in the unfolded state, where the displayed first interface includes the interface element having the second height and the second width.

It can be learned from the foregoing method that the electronic device may obtain, through calculation based on user experience, a threshold of a ratio of a height to the screen height, and design that the ratio of the second height of the interface element to the screen height is less than the threshold. In this way, a phenomenon that a large image and a large font size appear on the electronic device in the unfolded state can be effectively reduced, a use habit of the user can be complied with, and user experience is improved.

In addition, a phenomenon that a content information amount in the unfolded state of the electronic device is less can be further reduced, to further improve user experience. In the foregoing method, the second height of the interface element may alternatively be designed adaptively, and a developer does not need to manually design a size and a layout of the interface element in the unfolded state in an application development stage, and this reduces workload of the developer.

With reference to the first aspect, in some implementations, a ratio of the first width to the first height is equal to a ratio of the second width to the second height, or a difference between a ratio of the first width to the first height and a ratio of the second width to the second height is less than a first difference. In this way, the electronic device can ensure that an aspect ratio of the displayed interface element remains unchanged, and is more aesthetic.

With reference to the first aspect, in some implementations, a control layout type of the first interface is a content grid type, a quantity of images accommodated in one row of the displayed first interface is greater than or equal to a quantity of images accommodated in one row of the set first interface, and a quantity of images accommodated in one column of the displayed first interface is greater than or equal to a quantity of images accommodated in one column of the displayed first interface.

With reference to the first aspect, in some implementations, the interface element on the first interface includes a picture or a card, and an arrangement manner of the picture or the card is a grid type.

With reference to the first aspect, in some implementations, a width of the picture or the card on the set first interface is greater than a width of the picture or the card displayed when the electronic device is in the folded state.

The electronic device may perform layout design on interface elements of a plurality of content grids based on the following grid layout parameter relationship:

$$W = 2A + n * B1' + (n - 1) * C$$

W represents a screen width of the electronic device in the unfolded state, namely, an expansion width W. A represents a width between an interface element that is on the electronic device and that is closest to an edge of the screen and the edge of the screen, namely, a margin A. n represents a quantity of columns of interface elements of a content grid type displayed on the electronic device 100. B1' represents a second width obtained through calculation by the electronic device according to the foregoing formula (1). C represents a width of a spacing between every two columns of interface elements displayed on the electronic device, namely, a spacing C.

In this way, the electronic device may further adjust the interface element of the content grid type, so that the interface element displayed in the unfolded state is more aesthetic.

With reference to the first aspect, in some implementations, a control layout type of the first interface is a large image type, where the large image type means that the set first interface includes one photo, and a width of the photo is equal to a screen width, or a difference between a width of the photo and a screen width is less than the first difference.

The width of the photo on the set first interface is less than a width of the photo on the displayed first interface. Content of the photo that is accommodated by the displayed first interface in vertical space is greater than content of the photo that is accommodated by the set first interface in the vertical space.

With reference to the first aspect, in some implementations, a width of a photo on the set first interface is greater than a width of the photo displayed when the electronic device is in the folded state.

When displaying an interface element of the large image type, the electronic device may display the interface element in a manner of background blurring or cropping processing.

In this way, the electronic device may further adjust the interface element of the large image type, so that the interface element displayed in the unfolded state is more aesthetic.

With reference to the first aspect, in some implementations, a control layout type of the first interface is a social list type, and the social list type means that at least one social feed is displayed on the set first interface.

With reference to the first aspect, in some implementations, a structure of the social feed is that an upper part of the social feed is a text, and a lower part is a photo; or an upper part of the social feed is a photo, and a lower part is a text.

With reference to the first aspect, in some implementations, when the social feed includes only one photo, the width of the photo on the displayed first interface is less than the width of the photo on the set first interface. Content of the photo that is accommodated by the displayed first interface in vertical space is greater than content of the photo that is accommodated by the set first interface in the vertical space.

With reference to the first aspect, in some implementations, when the social feed includes a plurality of photos, a quantity of photos accommodated in one row of the displayed first interface is greater than a quantity of photos accommodated in one row of the set first interface, and a quantity of photos accommodated in one column of the displayed first interface is greater than a quantity of photos accommodated in one column of the set first interface.

With reference to the first aspect, in some implementations, a width of the photo on the set first interface is greater than a width of the photo displayed when the electronic device is in the folded state.

In this way, the electronic device may further adjust the interface element of the social list type, so that the interface element displayed in the unfolded state is more aesthetic.

With reference to the first aspect, in some implementations, a control layout type of the first interface is a text list type, and the text list type means that a text is displayed on the set first interface, and a text font of the displayed first interface is smaller than a text font of the set first interface.

With reference to the first aspect, in some implementations, a text font of the set first interface is greater than a font of the text displayed when the electronic device is in the folded state.

In this way, the electronic device may further adjust the interface element of the text list type, so that the interface element displayed in the unfolded state is more aesthetic.

With reference to the first aspect, in some implementations, a control layout type of the first interface is an application entry type, the interface element of the first interface is a function entry icon, and the function entry icon on the displayed first interface is smaller than the function entry icon on the set first interface.

With reference to the first aspect, in some implementations, a quantity of function entry icons accommodated in one row of the displayed first interface is equal to a quantity of function entry icons accommodated in one row of the set first interface; and a gap between every two function entry icons accommodated in one row of the displayed first interface is greater than a gap between every two function entry icons accommodated in one row of the set first interface.

With reference to the first aspect, in some implementations, the function entry icon on the set first interface is larger than the function entry icon displayed when the electronic device is in the folded state.

In this way, the electronic device may further adjust the interface element of the application entry type, so that the interface element displayed in the unfolded state is more aesthetic.

With reference to the first aspect, in some implementations, that the first height and the first width are determined based on a height and a width of the interface element in a folded state of the electronic device specifically includes:

obtaining the first width based on a width variation of a screen of the electronic device in the unfolded state and in the folded state, where the width of the interface element in the folded state and a variation of the first width are positively correlated with the width variation of the screen in the unfolded state and in the folded state, and an aspect ratio of the interface element in the folded state is consistent with an aspect ratio that is set in the unfolded state, or a difference between an aspect ratio of the interface element in the folded state and an aspect ratio that is set in the unfolded state is less than a second difference.

With reference to the first aspect, in some implementations, before the electronic device obtains a first height and a first width that are of an interface element on a first interface and that are set in an unfolded state, the method further includes: The electronic device detects that the electronic device is switched from a folded state to an unfolded state.

With reference to the first aspect, in some implementations, the foldable screen includes a first screen and a second screen that are disposed on a same side of the electronic device. That the electronic device displays the first interface in the unfolded state specifically includes: The electronic device jointly displays the first interface on the first screen and the second screen in the unfolded state.

That the first height and the first width are determined based on a height and a width of the interface element in a folded state of the electronic device specifically includes: The first height and the first width are determined based on the height and the width of a first interface element displayed on the first screen when the electronic device is in the folded state.

With reference to the first aspect, in some implementations, the foldable screen includes a first screen disposed on one side of the electronic device, and a second screen and a third screen on the other side of the electronic device. That the electronic device displays the first interface in the unfolded state specifically includes: The electronic device jointly displays the first interface in the unfolded state through the second screen and the third screen. That the first height and the first width are determined based on a height and a width of the interface element in a folded state of the electronic device specifically includes: The first height and the first width are determined based on a height and a width of a first interface element displayed on the first screen when the electronic device is in the folded state.

According to a second aspect, an embodiment of this application provides an electronic device, including a memory and one or more processors. The memory is coupled to one or more processors, the memory is configured to store computer program code, the computer program code includes computer instructions, and the one or more processors invoke the computer instructions, so that the electronic device performs the method according to any one of the first aspect or the implementations of the first aspect.

According to a third aspect, an embodiment of this application provides a computer-readable storage medium, including instructions. When the instructions are run on an electronic device, the electronic device is enabled to perform the method according to any one of the first aspect or the implementations of the first aspect.

It may be understood that both the electronic device provided in the second aspect and the computer storage medium provided in the third aspect are configured to perform the method provided in embodiments of this application. Therefore, for beneficial effects that can be achieved by the method, refer to beneficial effects in the corresponding method. Details are not described herein again.

BRIEF DESCRIPTION OF DRAWINGS

FIG. 12 is a schematic flowchart of a display method for a foldable screen according to an embodiment of this application;

DESCRIPTION OF EMBODIMENTS

The technical solutions according to embodiments of this application are clearly and completely described in the following with reference to the accompanying drawings. In the descriptions of embodiments of this application, unless otherwise specified, "/" indicates "or". For example, A/B may indicate A or B. The term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

A term "user interface (user interface, UI)" in the following embodiments of this application is a medium interface for interaction and information exchange between an application or an operating system and a user, and implements conversion between an internal form of information and a form that can be accepted by the user. The user interface is source code written in a specific computer language such as Java or an extensible markup language (extensible markup language, XML). The interface source code is parsed and rendered on an electronic device, and finally presented as content that can be identified by the user. The user interface is usually represented in a form of a graphical user interface (graphical user interface, GUI), and is a user interface that is related to a computer operation and that is displayed in a graphic manner. The user interface may be a visual interface element such as a text, an icon, a button, a menu, a tab, a text box, a dialog box, a status bar, a navigation bar, or a Widget that is displayed on a display of the electronic device.

Figure 1:
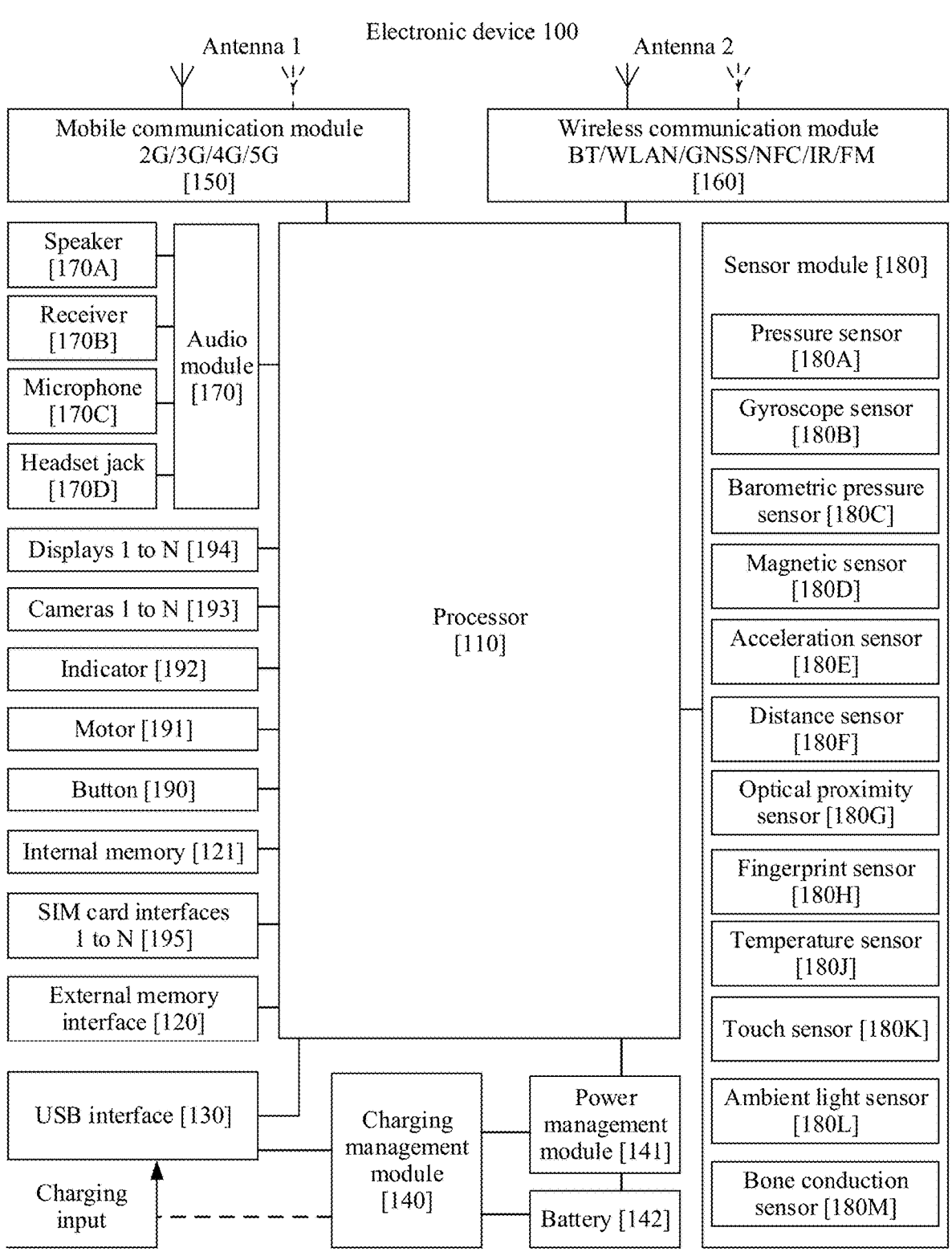
FIG. 1 is a schematic diagram of a structure of an electronic device 100 according to an embodiment of this application.

To describe the method provided in embodiments of this application more clearly, the following describes an example electronic device 100 provided in embodiments of this application. FIG. 1 is a schematic diagram of a structure of an electronic device 100.

The electronic device 100 may be a mobile phone, a tablet computer, a desktop computer, a laptop computer, a handheld computer, a notebook computer, an ultra-mobile personal computer (ultra-mobile personal computer, UMPC), a netbook, a cellular phone, or a personal digital assistant (personal digital assistant, PDA), augmented reality (augmented reality, AR) device, virtual reality (virtual reality, VR) device, artificial intelligence (artificial intelligence, AI) device, wearable device, in-vehicle device, smart home device, and/or smart city device, a specific type of the electronic device 100 is not limited in the embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The illustrated components may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may determine, based on whether an interface element belongs to a text control or an image control and a control size, a control layout type to which the control belongs. The processor 110 may further set a second height of the control based on obtained threshold values of different types of control layout types, and further obtain a second width of the control through calculation. The processor 110 may further change a control layout to some extent based on processing manners of the different types of control layout types.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, including a serial data line (serial data line, SDA) and a serial clock line (serial clock line, SCL). In some embodiments, the processor 110 may include a plurality of groups of I2C buses.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal.

The UART interface is a universal serial data bus, and is configured to perform asynchronous communication.

The MIPI interface may be configured to connect the processor 110 to a peripheral component such as the display 194 or the camera 193.

The GPIO interface may be configured by software.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device.

It may be understood that an interface connection relationship between the modules that is shown in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger, or may be a wired charger.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery state of health (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like.

The modem processor may include a modulator and a demodulator. The modulator is configured to modulate a to-be-sent low-frequency baseband signal into a medium-high frequency signal. The demodulator is configured to demodulate the received electromagnetic wave signal into the low-frequency baseband signal.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and is connected to the display 194 and the application processor. The GPU is configured to perform mathematical and geometric calculations, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor and the like.

The ISP is configured to process data fed back by the camera 193. The camera 193 is configured to capture a static image or a video.

The digital signal processor is configured to process a digital signal, and may process another digital signal in addition to the digital image signal.

The video codec is used to compress or decompress digital video.

The NPU is a neural-network (neural-network, NN) computing processor, quickly processes input information by referring to a structure of a biological neural network, for example, by referring to a transmission mode between human brain neurons, and may further continuously perform self-learning. Applications such as intelligent cognition of the electronic device 100 may be implemented through the NPU, for example, image recognition, facial recognition, speech recognition, and text understanding.

The internal memory 121 may include one or more random access memories (random access memories, RAMs) and one or more non-volatile memories (non-volatile memories, NVMs). The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth generation DDR SDRAM is generally referred to as a DDR5 SDRAM), and the like. The nonvolatile memory may include a magnetic disk storage device, a flash memory (flash memory), and the like.

The flash memory may be classified, based on an operation principle, into an NOR flash, an NAND flash, a 3D NAND flash, and the like; may be classified, based on a quantity of electric potential levels of a cell, into a single-level cell (single-level cell, SLC), a multi-level cell (multi-level cell, MLC), a triple-level cell (triple-level cell, TLC), a quad-level cell (quad-level cell, QLC), and the like; or the flash memory may be classified, based on storage specifications, into a universal flash storage (English: universal flash storage, UFS), an embedded multimedia memory (embedded multi media Card, eMMC), and the like.

The external memory interface 120 may be configured to connect to an external nonvolatile memory, to extend a storage capability of the electronic device 100. The external nonvolatile memory communicates with the processor 110 through the external memory interface 120, to implement a data storage function. For example, files such as music and videos are stored in the external nonvolatile memory.

A foldable electronic device 100 (also referred to as a "foldable screen device" or "electronic device 100" below for short) may be specifically an electronic device 100 whose display may be folded. The display 194 of the electronic device 100 may refer to an integrated flexible display, may refer to a spliced display formed by using a plurality of flexible displays and a hinge located between each two flexible displays, may refer to a spliced display formed by using a plurality of rigid displays and a flexible display located between each two rigid displays, may refer to a spliced display formed by using a plurality of rigid displays and a hinge located between each two rigid displays, or the like. This is not limited in this embodiment of this application.

Alternatively, the display 194 may be formed by splicing a plurality of subscreens, and the subscreens may be connected by using a hinge. The subscreen may be a flexible display, or may not be a flexible display. The display 194 may be an entire flexible display. The plurality of subscreens may be a plurality of parts of the entire flexible display.

When the electronic device 100 is in an unfolded state, a plurality of subscreens on a same side of the electronic device 100 may be displayed as a screen. Refer to a schematic diagram of the electronic device 100 in an unfolded state shown in FIG. 2A.

Figure 2A:
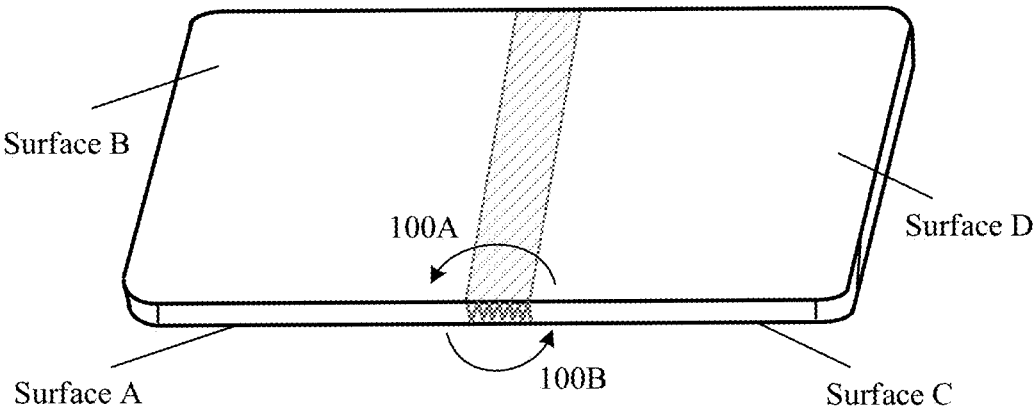
FIG. 2A is a schematic diagram of an unfolded electronic device according to an embodiment of this application.
Figure 2B:
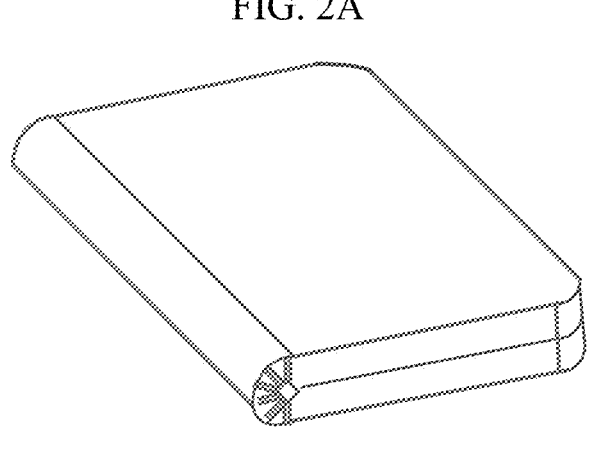
FIG. 2B is a schematic diagram of a folded electronic device according to an embodiment of this application.

When the electronic device 100 is in a folded state, refer to a schematic diagram of the electronic device 100 in a folded state shown in FIG. 2B. In a possible implementation, one subscreen of the display 194 may display an interface element, and another subscreen does not display the interface element. The electronic device 100 may respond to a user operation performed on one of the subscreens, and the another subscreen does not respond to a user operation performed on the subscreen in this case. In another possible implementation, interface information may be displayed on a plurality of subscreens, and the electronic device 100 may respond to user operations performed on the plurality of subscreens. This is not limited herein.

That the electronic device 100 is in the unfolded state may mean that a plurality of subscreens on a same side of the electronic device 100 form a same plane or form an approximate plane. The sensor module 180 may detect that an included angle between the plurality of subscreens on the same side of the electronic device 100 is 180 degrees (an actual angle may not reach 180 degrees, and an actual detected angle prevails), or the sensor module 180 may detect that an included angle between the plurality of subscreens on the same side of the electronic device 100 is greater than a threshold, as shown in FIG. 2A. In this case, the plurality of subscreens on the same side of the electronic device 100 and the display 194 jointly displays the interface element.

For ease of describing the folded state, the unfolded state, and dynamic switching between the two states of the foldable electronic device, as shown in FIG. 2A, the foldable electronic device may be divided into four surfaces: a surface A, a surface B, a surface C, and a surface D. The surface A is a surface on which a housing of a primary screen is located, the surface B is a surface on which a touch panel of the primary screen is located, the surface C is a surface on which a housing of a secondary screen is located, and the surface D is a surface on which a touch panel of the secondary screen is located.

The foldable electronic device may be in a complete or nearly complete folded state by folding the primary screen and the secondary screen inwards. In this case, the surface A and the surface C are exposed, and the surface B and the surface D may be in partial or complete contact. In this case, the primary screen and the secondary screen may be set to a screen-off state because a user cannot see the primary screen and the secondary screen because of folding inwards. Herein, folding inwards may be shown in FIG. 2A, and the primary screen and the secondary screen are folded along a first direction 100A.

The foldable electronic device may alternatively be in another complete or nearly complete folded state by folding the primary screen and the secondary screen outwards. In this case, the surface B and the surface D are exposed, and the surface A and the surface C may be in partial or complete contact. Herein, folding outwards may be shown in FIG. 2A, and the primary screen and the secondary screen are folded along a second direction 100B. In an implementation, the primary screen may display content, and the secondary screen may be in the screen-off state without displaying content. In another implementation, both the primary screen and the secondary screen can display content.

In another possible implementation, the surface A may alternatively be the surface on which the touch panel of the primary screen is located, and the surface B and the surface D are surfaces on which the touch panel of the secondary screen is located. The electronic device 100 may display content on the surface B and the surface D before the electronic device 100 is folded along the first direction 100A (that is, when the electronic device 100 is in the unfolded state). The electronic device 100 may display content on the surface A after the electronic device 100 is folded along the first direction 100A (that is, when the electronic device 100 is in the folded state).

The foldable electronic device may alternatively be in an unfolded state by folding the primary screen and the secondary screen outwards or inwards. The unfolded state may mean that an included angle between the surface B and the surface C of the foldable electronic device is greater than a specific angle, where the specific angle may be, for example, 110°. In this case, input/output panels of the surface B and the surface C can be fully exposed to the user, so that human-machine interaction can be implemented conditionally. The unfolded state may include a plurality of open positions, and the open position may be defined by using the included angle between the surface B and the surface C, for example, 110°, 120°, 150°, or 180°. When the included angle between the surface B and the surface C is equal to or close to 180°, the foldable electronic device is in a completely or nearly completely unfolded state. Both the primary screen and the secondary screen belong to a plurality of subscreens.

That the electronic device 100 is in the folded state may mean that a plurality of subscreens on a same side of the electronic device 100 are parallel or approximately parallel. The sensor module 180 may detect that an included angle between the plurality of subscreens on the same side of the electronic device 100 is 0 or 180 degrees (an actual angle may not reach 0 or 180 degrees, and an actual detected angle prevails), or the sensor module 180 may detect that an included angle between the plurality of subscreens on the same side of the electronic device 100 is less than a threshold, as shown in FIG. 2B. It should be noted that the folded state may be classified into two postures: outward folding and inward folding. The outward folding may be a case in which the display 194 is exposed to the outside in the folded state and the housing is folded and hidden inside (which may be referred to as an outward folding posture or a back-off posture). In this case, interface information may be displayed on one of the subscreens of the display 194. The inward folding may be a case in which the display 194 is folded and hidden inside and the housing is exposed to the outside (which may be referred to as an inward folding posture). In this case, the interface element may not be displayed, or another manner of displaying the interface element may exist. This is not limited in this embodiment of this application.

The electronic device 100 may support the electronic device 100 in switching from the folded state to the unfolded state. That the electronic device 100 switches from the folded state to the unfolded state may mean that a plurality of subscreens on a same side of the electronic device 100 switch from being parallel or approaching to being parallel to forming a same plane or forming an approximate plane. The sensor module 180 may detect that an included angle between the plurality of subscreens on the same side of the electronic device 100 changes from being less than the threshold to being greater than the threshold. When being in the folded state, the interface element (like a text control or an image control) displayed on the electronic device 100 is arranged based on a screen width of the electronic device 100 in the folded state. In other words, a layout and a size of the interface element displayed by the electronic device 100 adapt to the screen width of the electronic device 100 in the folded state. When the electronic device 100 switches from the folded state to the unfolded state, the screen width of the electronic device 100 may change. If the layout and the size of the interface element displayed by the electronic device 100 are still the same as those of a control in the folded state, a phenomenon that the layout and the size of the interface element do not match the screen width of the electronic device 100 in the unfolded state may occur, and there is a blank area on the screen. In this way, user experience may be affected. Therefore, when the electronic device 100 is in the unfolded state, the size of the interface element may be changed to some extent.

Research based on a use distance of the electronic device 100 used by the user shows that a use distance of the user when the electronic device 100 is in the unfolded state is approximately 1.1 times that in the folded state. Therefore, theoretically, a control interface element (like a text control and an image control) displayed by the electronic device 100 may be appropriately increased. However, when the interface element displayed by the electronic device 100 becomes excessively large, a phenomenon of a large font and a large image occurs, and information displayed on the screen is lost, resulting in poor user experience.

The following describes in detail a display method for a foldable screen provided in this embodiment of this application with reference to the accompanying drawings and application scenarios.

It may be understood that user interfaces described in the following embodiments of this application are merely example interfaces, and do not constitute a limitation on another embodiment of this application. In another embodiment, the user interface may use different interface layouts, may include more or fewer controls, and may add or reduce other function options. The following example interface may alternatively be migrated to another type of device. All technical solutions based on a same inventive idea provided in this application fall within the protection scope of this application.

Figure 3A:
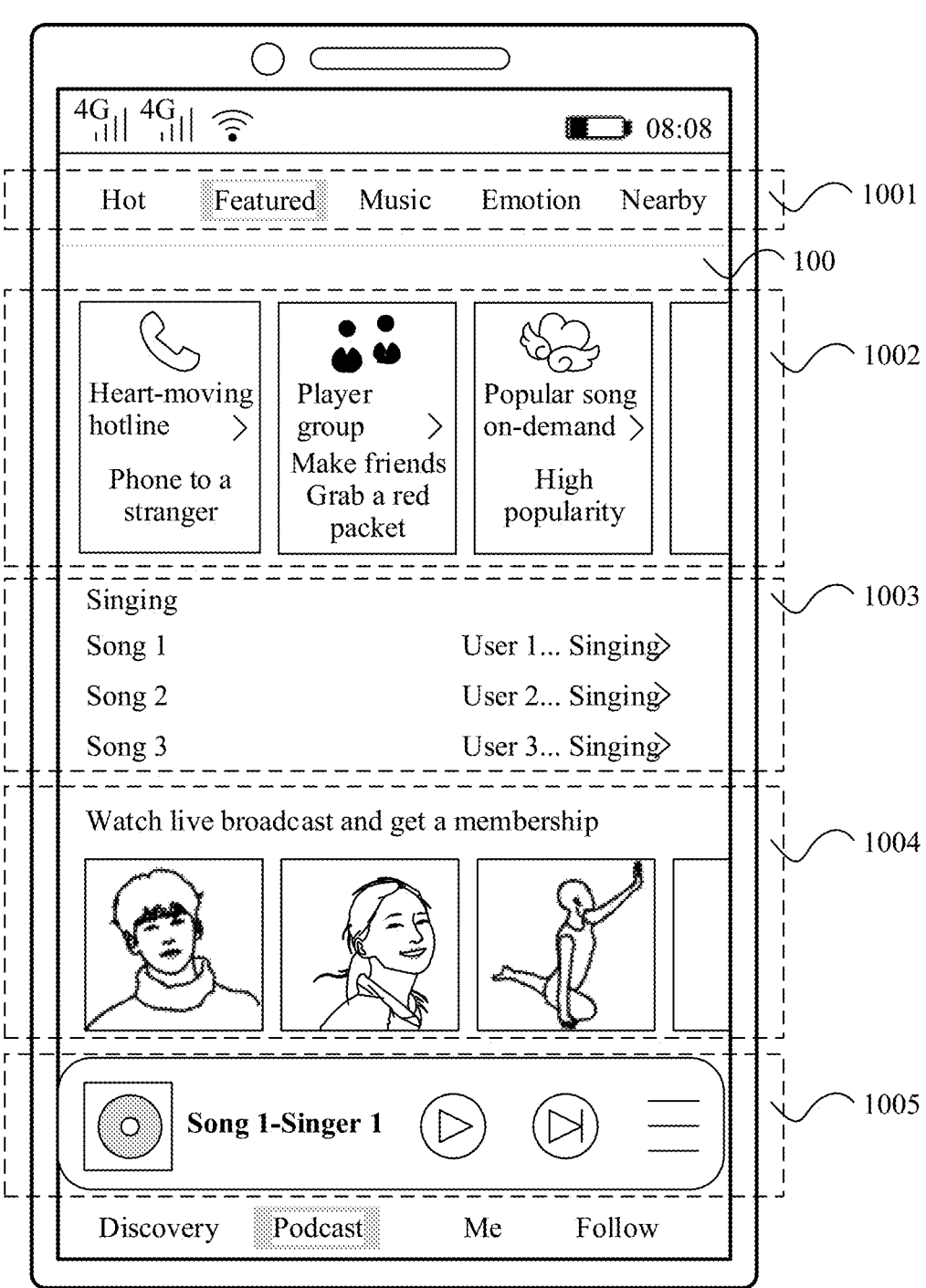
FIG. 3A to FIG. 6B are schematic diagrams of user interfaces according to an embodiment of this application.
Figure 3B:
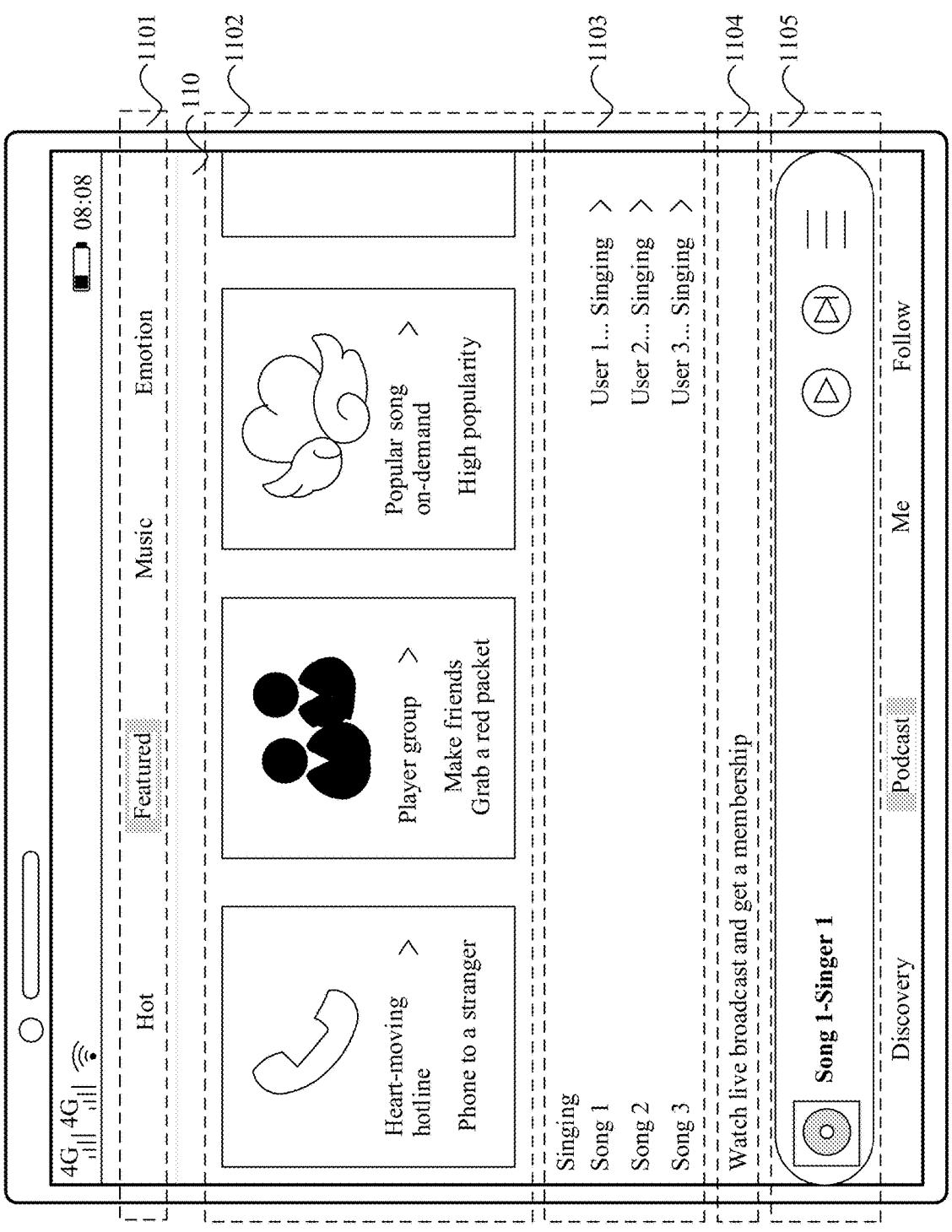

FIG. 3A and FIG. 3B show examples of a display method for a foldable screen according to an embodiment of this application.

As shown in FIG. 3A, when an electronic device 100 is in a folded state, a user interface 100 may be displayed on one of subscreens. The user interface 100 may be a user interface of an audio application. The user interface 100 may include a page selection bar 1001, an interaction function bar 1002, a singing bar 1003, a live broadcast bar 1004, and a music playing display bar 1005.

The page selection bar 1001 may display one or more page selection options. The page selection options may include: a hot option, a featured option, a music option, an emotion option, and a nearby option. When user operations performed on the page selection options are detected, the electronic device 100 may display different page information. For example, the user interface 100 shown in FIG. 3A is a page displayed by the electronic device 100 in response to a user operation performed on the featured option. Not limited to those shown in FIG. 3A, the page selection bar 1001 may further include more or fewer page selection options. The user may browse another page selection option by sliding left/right in the page selection bar 1001.

The interaction function bar 1002 may be used to monitor a user operation that triggers another interaction function. The interaction function bar 1002 may display one or more interaction function options. The interaction function options may include: a heart-moving hotline function option, a player group function option, and a popular song on-demand function. Not limited to those shown in FIG. 3A, the interaction function bar 1002 may further include more or fewer interaction function options. The user may browse another interaction function option by sliding left/right in the interaction function bar 1002. It should be noted that each interaction function option in the interaction function bar 1002 shown in FIG. 3A may be displayed in a form of an image control.

The singing bar 1003 may be used to monitor a user operation that triggers playing of a song that is being sung by another user. The singing bar 1003 may display information about one or more songs that are being sung. The information about the song that is being sung may include a song name and a name of a user that is singing.

The live broadcast bar 1004 may be used to monitor a user operation that triggers entering a live broadcast. The live broadcast bar 1004 may display one or more live broadcast options. It should be noted that each live broadcast option in the live broadcast bar 1004 shown in FIG. 3A may be displayed in a form of an image control.

The music playing display bar 1005 is used to display information about a song that is being played. The music playing display bar 1005 may include a pause control, a next-track control, and more controls. The electronic device 100 may display a full-screen interface for playing a song in response to an operation performed by the user on an area other than the controls displayed in the music playing display bar 1005.

As shown in FIG. 3B, when the foldable screen is switched from the folded state to an unfolded state, a plurality of subscreens on a same side of the electronic device 100 may jointly display the user interface 110. Compared with that of the page selection bar 1001, the singing bar 1003, and the music playing display bar 1005 of the user interface 100, heights of a page selection bar 1101, a singing bar 1103, and a music playing display bar 1105 basically remain unchanged, and widths are adaptively adjusted. In this case, on the user interface 110, because each function option of an interaction function bar 1102 is displayed in the form of an image control, a height and a width of the interaction function bar 1102 definitely increase. However, a screen height remains unchanged in the unfolded state. Vertical space of the screen is definitely insufficient to display all original interface elements shown in FIG. 3A. As a result, the live broadcast bar 1104 cannot be completely displayed on the user interface 110.

It can be learned that the display methods shown in FIG. 3A and FIG. 3B may cause a decrease in an amount of information displayed by the electronic device 100. To avoid that the image is not deformed and better adapt to a screen ratio in the unfolded state, the electronic device 100 may change a size of the interface element (for example, an element like an icon font becomes excessively large) in the unfolded state. However, the screen height of the electronic device 100 in the unfolded state does not change. As a result, less interface content may be displayed by the electronic device 100. The electronic device 100 needs to display reduced content in another manner. For example, the electronic device 100 displays the reduced content in response to an upward/downward sliding operation performed by the user on the screen. In this case, a phenomenon that content displayed on the screen is reduced due to an excessively large control change in the electronic device 100 in the unfolded state may not only affect layout aesthetics, but also affect user experience.

Figure 4A:
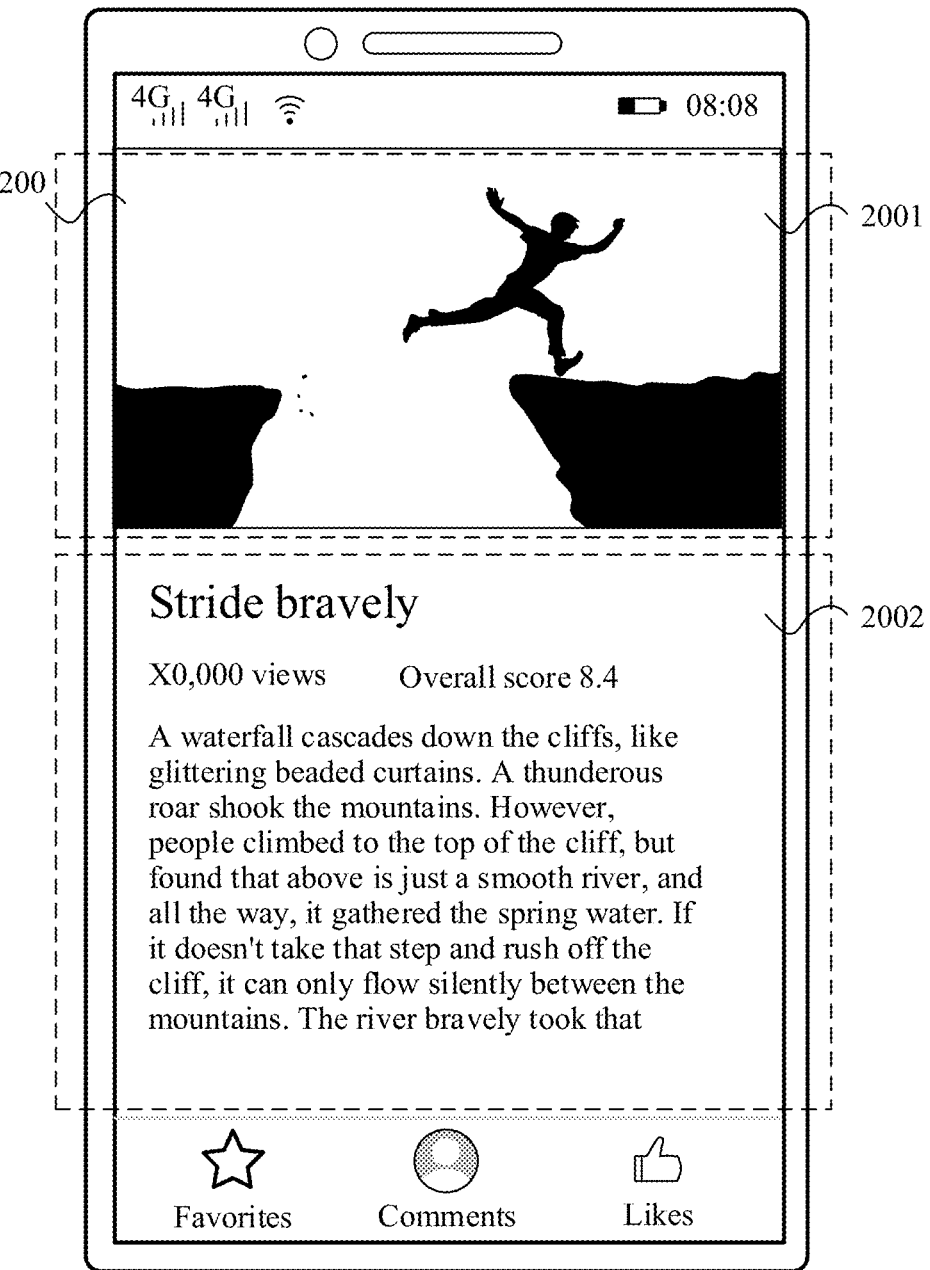
Figure 4B:
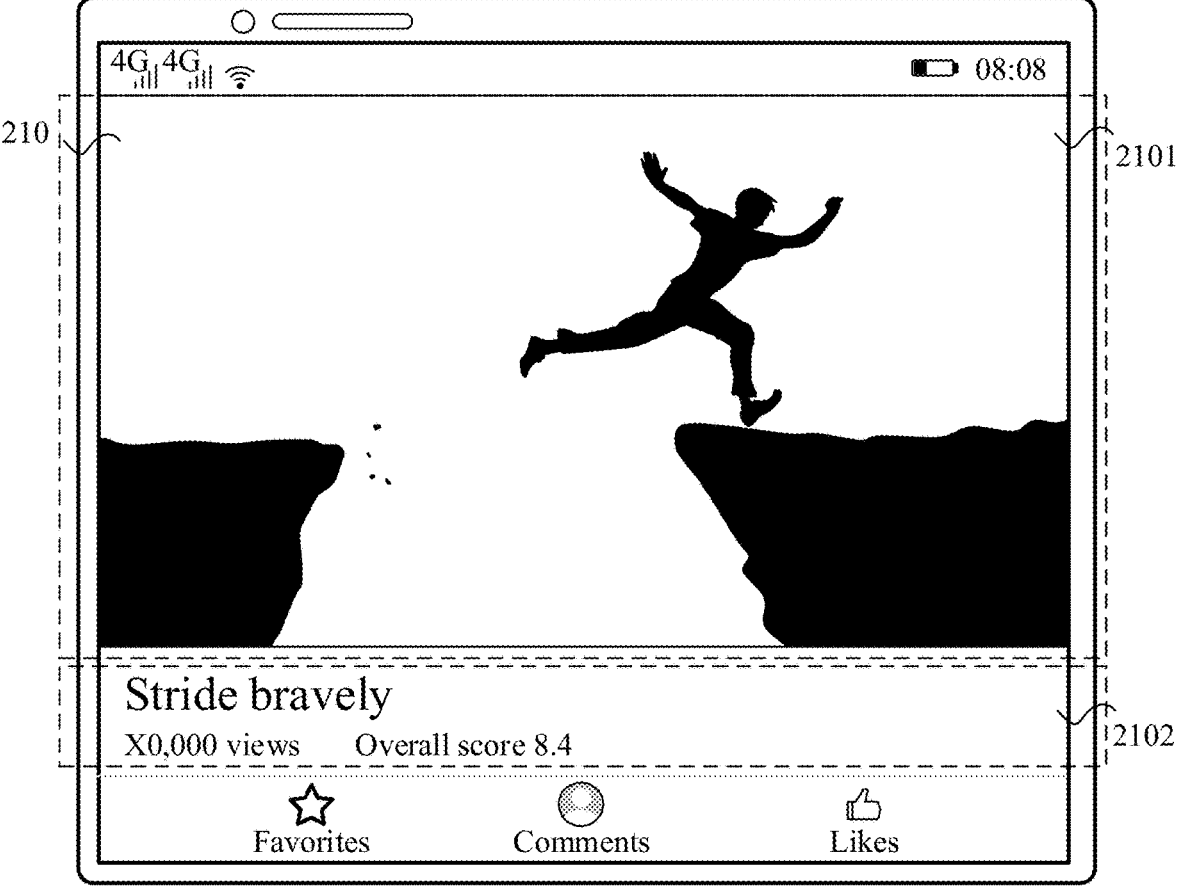

FIG. 4A and FIG. 4B show examples of another display method for a foldable screen according to an embodiment of this application.

As shown in FIG. 4A, when the foldable screen is in a folded state, a user interface 200 may be displayed on one of subscreens. The user interface 200 may be a user interface of a video application. The user interface 200 may include a video playing area 2001 and a video introduction area 2002.

The video playing area 2001 may be used to display a played video. When a user operation performed on the video playing area 2001 is detected, an electronic device 100 may have different feedback information. For example, the electronic device 100 may display a video in full screen in response to a double-tap operation performed by the user on the video playing area 2001. The electronic device 100 may pause video playing in response to a tap operation performed by the user on the video playing area 2001. It should be noted that the video playing area 2001 shown in FIG. 4A may be displayed in a form of an image control.

The video introduction area 2002 may be used to introduce related information of the video. The related information includes a video name, a quantity of times of playing, an overall score, and a video introduction. The electronic device 100 may display a video detailed introduction interface in response to an operation performed by the user on the video introduction area 2002. It should be noted that the video introduction area 2002 shown in FIG. 4A may be displayed in a form of a text control.

As shown in FIG. 4B, when the foldable screen is switched from the folded state to an unfolded state, a plurality of subscreens on a same side of the electronic device 100 may jointly display a user interface 210. In this case, on the user interface 210, a video playing area 2101 definitely becomes larger than the video playing area 2001 shown in FIG. 4A. Because a screen height remains unchanged, vertical space of the screen is definitely insufficient to display all interface elements after the change. As a result, a video introduction area 2102 cannot be completely displayed on the user interface 210.

It can be learned that the display method shown in FIG. 3A and FIG. 3B may cause a decrease in an amount of information displayed by the electronic device 100. An interface element displayed by the electronic device 100 in the unfolded state is excessively large, but a screen height does not change. Consequently, displayed content becomes less. This may not only affect layout aesthetics, but also may affect user experience.

Figure 5A:
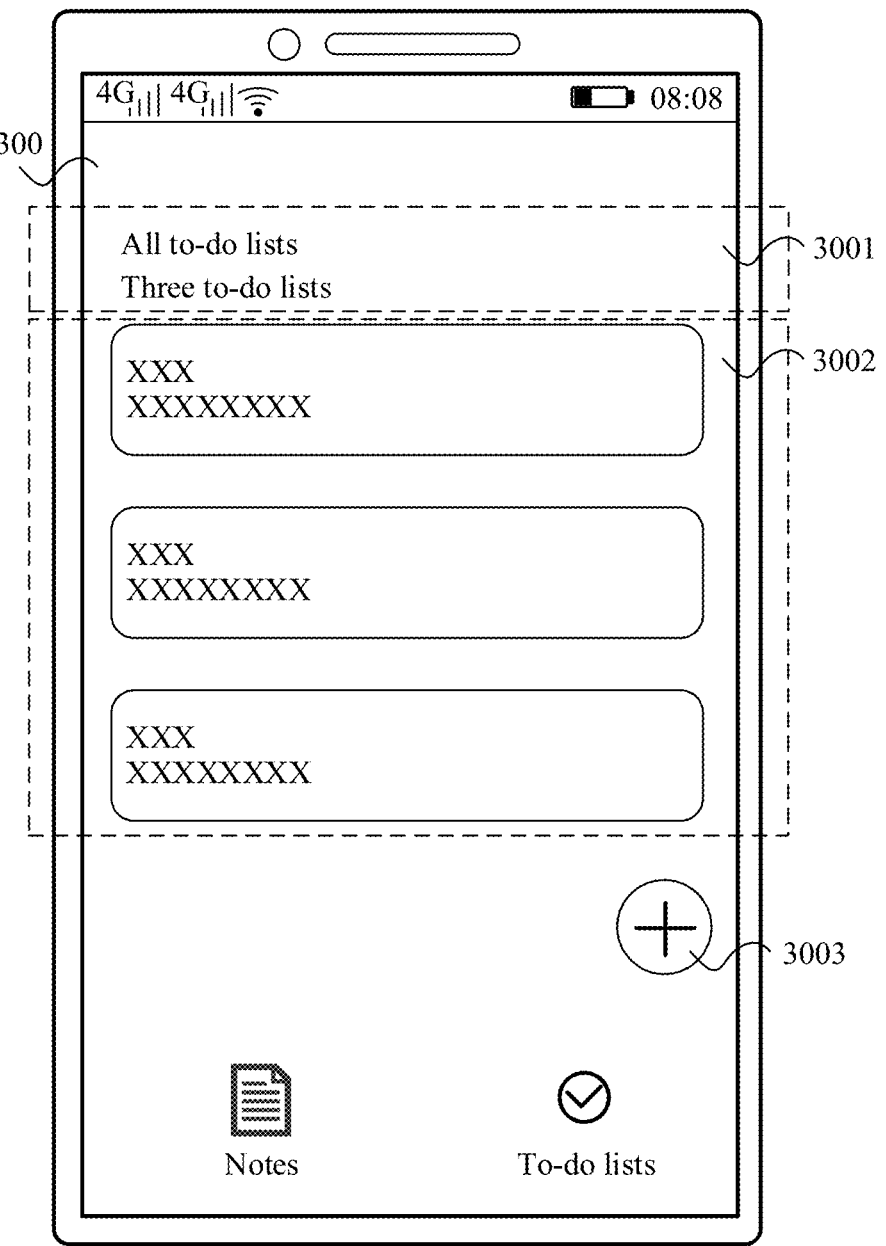
Figure 5B:
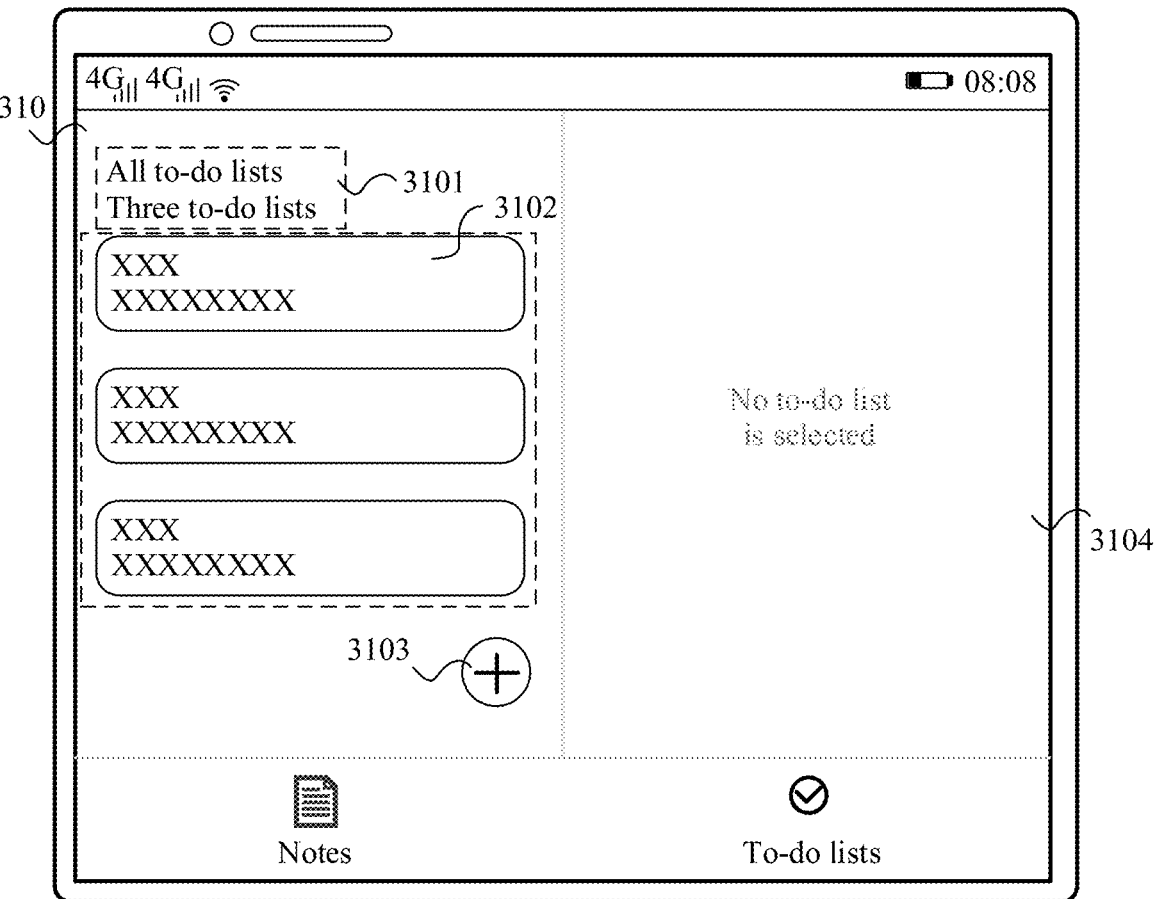

FIG. 5A and FIG. 5B show examples of still another display method for a foldable screen according to an embodiment of this application.

As shown in FIG. 5A, when the foldable screen is in a folded state, a user interface 300 may be displayed on one of subscreens. The user interface 300 may be a user interface of a notepad application. The user interface 300 may include a title bar 3001, a to-do list bar 3002, and an add control 3003.

The title bar 3001 may include a title of a current page, like "all to-do lists and three to-do lists".

The to-do list bar 3002 may include one or more to-do lists. An electronic device 100 may display specific content of a to-do list in response to an operation performed by a user on the to-do list.

The add control 3003 may be used to add a new to-do list. The electronic device 100 may display a page for adding a to-do list and add a new to-do list in response to an operation performed by the user on the add control 3003.

As shown in FIG. 5B, when the foldable screen is switched from the folded state to an unfolded state, one of the subscreens may still display the user interface 300, an interface layout of the user interface basically does not change, a title bar 3101, a to-do list bar 3102, and an add control 3103 are still included, and sizes of interface elements remain roughly unchanged. A secondary screen of the foldable screen may display an association interface 310 of the user interface 300. For example, when the user interface 300 displays a created to-do list shown in FIG. 5A, and no specific created to-do list is selected, the association interface 310 may display "No to-do list is selected" in the to-do list display area 3104.

It can be learned that, although the display method shown in FIG. 5A and FIG. 5B can keep content information on the interface not reduced, the association interface 310 of the user interface 300 needs to be additionally provided for the application. When there are a large quantity of applications and each application usually has a plurality of user interfaces, a developer needs to learn of different screen sizes of various electronic devices, and then develop an association interface of a user interface. The foregoing display method significantly increases a development workload, and is difficult to implement.

Figure 6A:
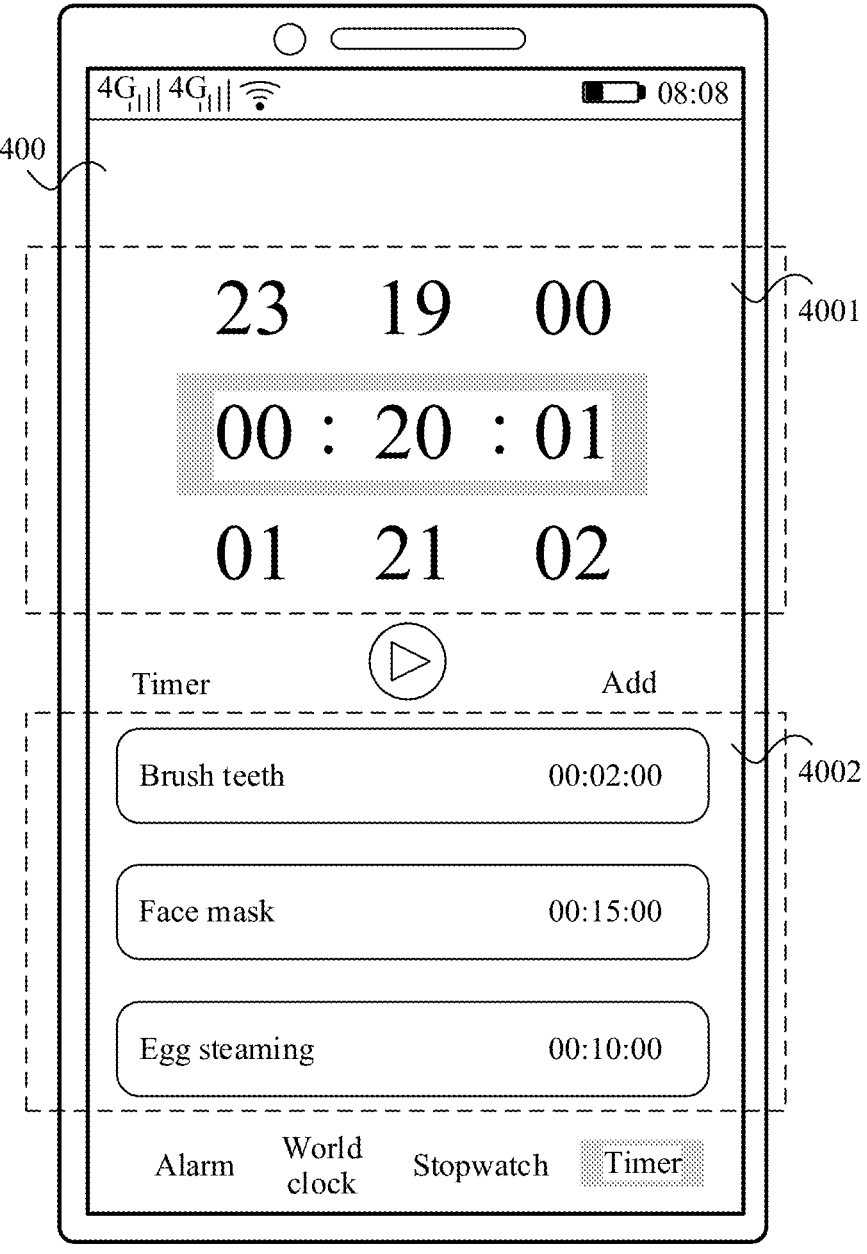
Figure 6B:
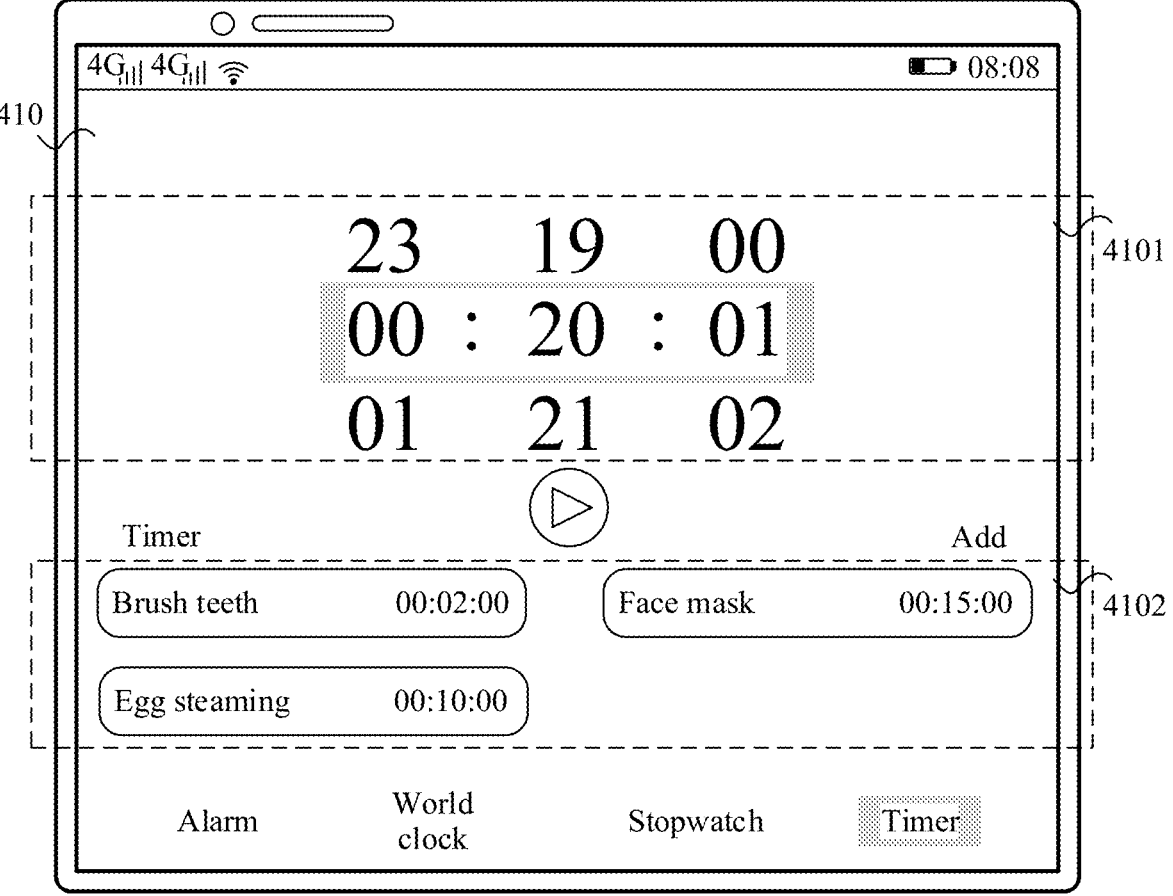

FIG. 6A and FIG. 6B show examples of still another display method for a foldable screen according to an embodiment of this application.

As shown in FIG. 6A, when the foldable screen is in a folded state, a user interface 400 may be displayed on one of subscreens. The user interface 400 may be a user interface of a clock application. The user interface 400 may include a time selection bar 4001 and a timing item bar 4002.

The time selection bar 4001 is used to monitor a user operation that triggers selection of a time size for timing. Three columns of time from left to right of the time selection bar 4001 may respectively indicate a clock, a minute, and a second of the time size. A user may change the time size by sliding up/down in the three columns of time in the time selection bar 4001. Time covered by a gray area in the time selection bar 4001 is a time size selected by the user for timing, for example, "20 minutes and 01 seconds".

The timing item bar 4002 may include one or more timing items, and a title "timer". The timing item may include an item name and required timing time. As shown in FIG. 6A, the timing item bar 4002 is of a vertical layout, that is, one timing item is displayed in one row. The timing item bar 4002 may include a tooth brushing item, a mask item, an egg steaming item, and the like. The timing item in the timing item bar 4002 may be provided by the electronic device 100, or may be added by the user.

As shown in FIG. 6B, when the foldable screen is switched from the folded state to an unfolded state, a plurality of subscreens on a same side of the electronic device 100 may jointly display the user interface 410. In this case, on the user interface 410, a time selection bar 4101 definitely becomes larger than the time selection bar 4001 shown in FIG. 6A. A width and a height of each timing item in a timing item bar 4102 are basically the same as those of the timing item bar 4002 shown in FIG. 6A, but the timing item bar 4102 is changed from a vertical layout to a horizontal layout, that is, two timing items may be displayed in one row.

It can be learned that, although the display method shown in FIG. 6A and FIG. 6B can keep content information on the user interface 410 not reduced, a developer needs to adaptively design an appropriate layout form of a control based on different forms of the control. In this way, the developer needs to learn of different screen sizes of various electronic devices, and then design layouts of various controls. The foregoing display method significantly increases a development workload.

To resolve problems generated by the foregoing several display methods, embodiments of this application provide a display method for a foldable screen. The method can avoid a problem that when an electronic device 100 is switched from a folded state to an unfolded state, an interface element (like an icon or a text) displayed on one of the subscreens in the folded state becomes larger to adapt to a larger screen in the unfolded state, for example, a larger font or a larger icon.

In embodiments of this application, when the electronic device is switched from the folded state to the unfolded state, size adjustment of the interface element may be performed in two steps. First, a width of the interface element may be adjusted based on a width change of the screen (namely, a screen width variation between the folded state and the unfolded state), and then the height of the interface element is adjusted based on an adjusted width of the interface element, so that an aspect ratio of the interface element remains unchanged or almost remains unchanged before and after the adjustment. Herein, a first height and a first width of the interface element in the unfolded state may be obtained. In embodiments of this application, a manner of obtaining the first height and the first width is not limited. The width of the interface element may increase as the width of the screen increases. For example, a width increase proportion of the interface element may be the same as a width increase proportion of the screen. Second, to avoid a problem that an interface is not aesthetic due to an excessively large interface element like a large icon and a large font, a size of the interface element may be further fine-tuned, so as to control a height of the interface element to adapt to a height of the screen. Herein, a second height and a second width of the interface element may be obtained. Herein, "adaptation" may mean that the second height of the interface element and a height of a second screen are within a specific ratio range. For example, when the electronic device 100 is in the unfolded state, and an original picture of a photo is browsed, a ratio of a displayed height of the photo to a screen height needs to be controlled to not exceed 1/2.

The following describes in detail a display method for a foldable screen provided in an embodiment of this application with reference to a plurality of application scenarios shown in FIG. 7A and FIG. 7B, FIG. 8A and FIG. 8B, FIG. 9A and FIG. 9B, FIG. 10A and FIG. 10B, and FIG. 11A and FIG. 11B.

Figure 7A:
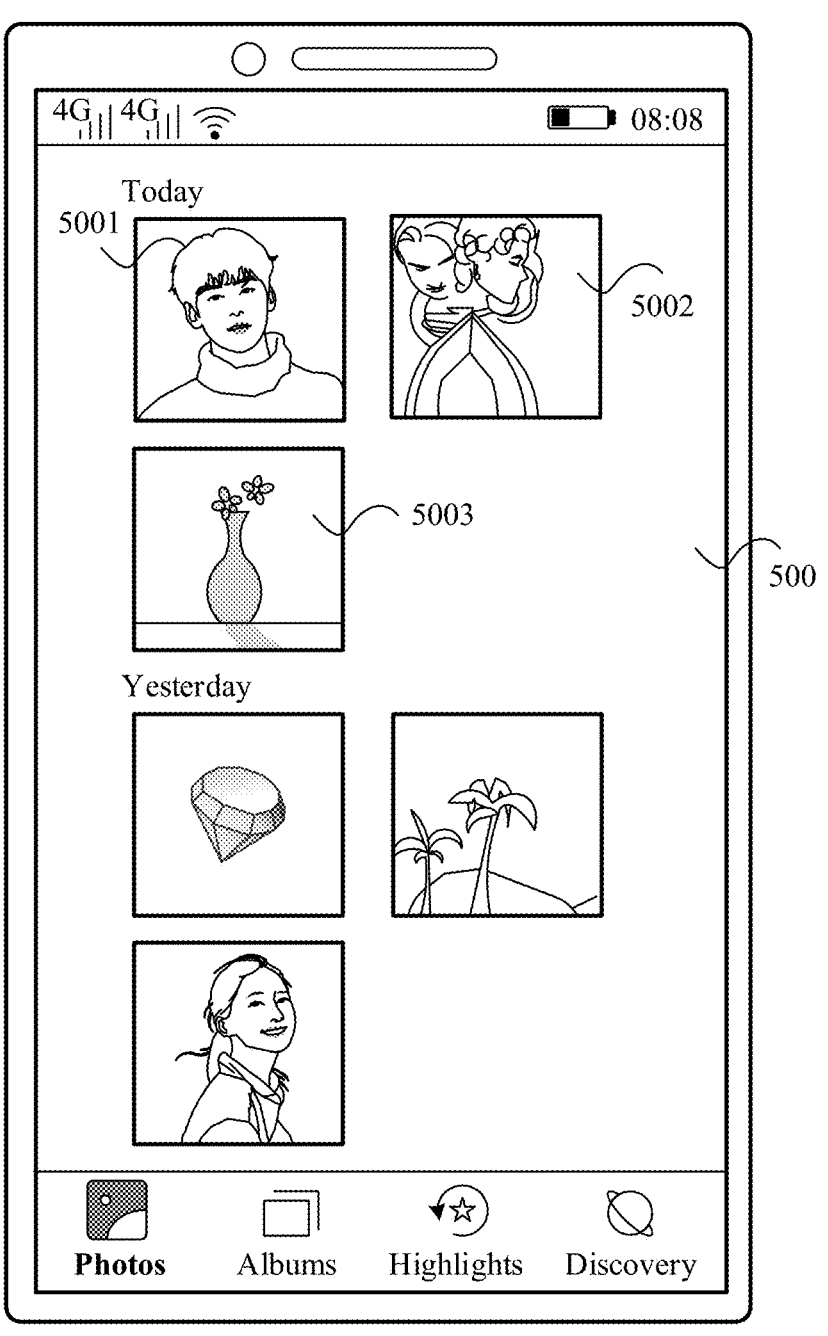
FIG. 7A and FIG. 7B are schematic diagrams of user interfaces of a content grid type according to an embodiment of this application.
Figure 7B:
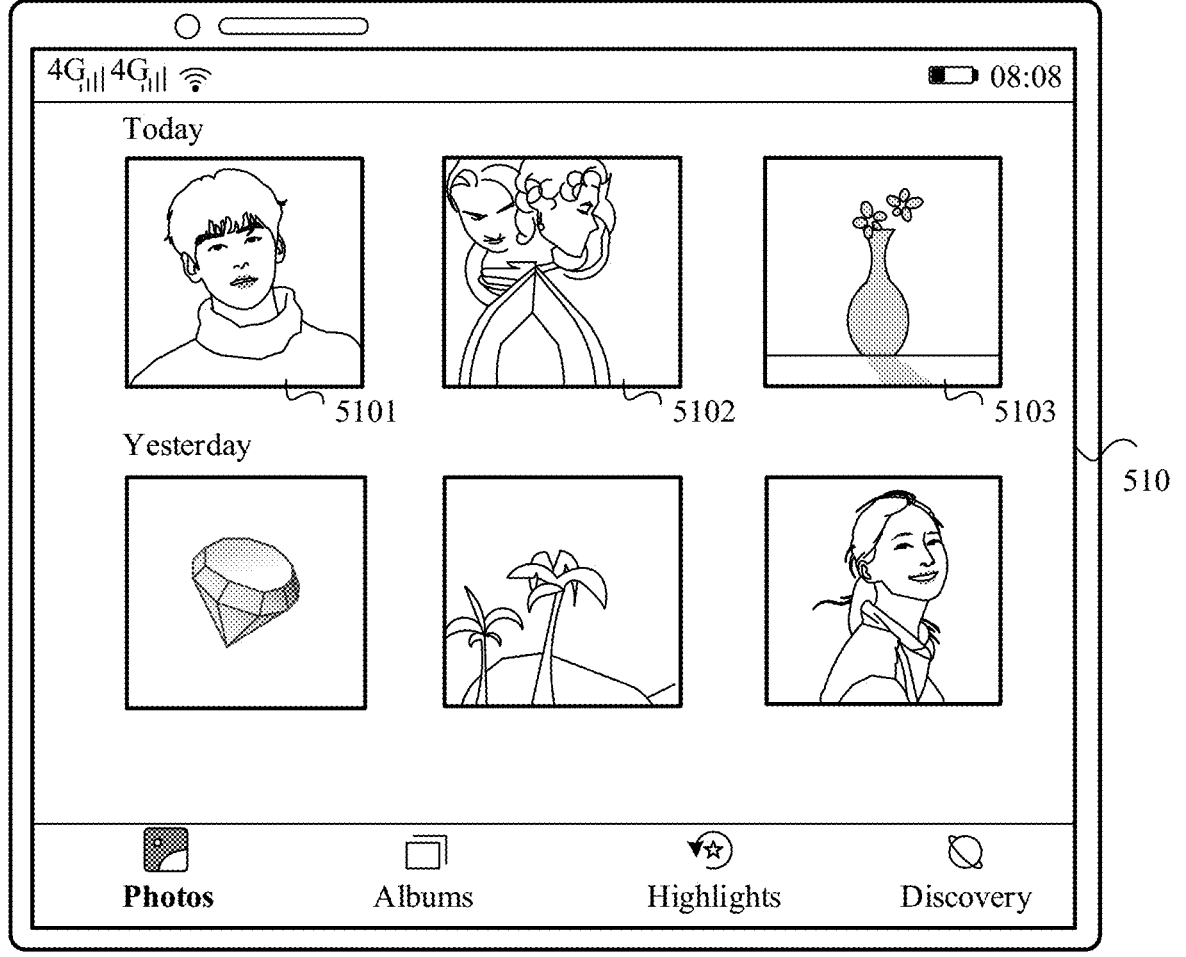

FIG. 7A and FIG. 7B show examples of a display method for a foldable screen according to an embodiment of this application in a photo preview scenario.

As shown in FIG. 7A, when the foldable screen is in a folded state, a user interface 500 may be displayed on one of subscreens. The user interface 500 may be a user interface of a photo preview application. In some embodiments, a control layout type shown on the user interface 500 may be referred to as a content grid type.

The user interface 500 may include a photo preview control 5001, a photo preview control 5002, and a photo preview control 5003.

The photo preview control 5001 and the photo preview control 5002 are arranged in a same row, and the photo preview control 5001 and the photo preview control 5003 are arranged in a same column. To be specific, a screen width of an electronic device 100 in the folded state may pose a limitation that only two photo preview controls can be displayed in a same row. Because each photo preview control may be used as an image control, the electronic device 100 may display an original photo corresponding to each photo preview control in response to an operation of a user on each photo preview control.

As shown in FIG. 7B, when the foldable screen is switched from the folded state to an unfolded state, a plurality of subscreens on a same side of the electronic device 100 may jointly display the user interface 510. In this case, on the user interface 510, a photo preview control 5101, a photo preview control 5102, and a photo preview control 5103 are larger than those shown in FIG. 7A. The electronic device 100 uses the adaptive method, provided in embodiments of this application, that is for a layout of a folded state and an unfolded state and that is applicable to a content grid type, so that the photo preview control 5101, the photo preview control 5102, and the photo preview control 5103 can be arranged in a same row. The electronic device 100 may adjust a size of each photo preview control based on a threshold range of a content grid type obtained through calculation. In other words, the electronic device 100 determines whether a ratio of a first height of each photo preview control to a screen height is within the threshold range. If the ratio is within the threshold range, a second height of each photo preview control is the first height; or if the ratio is beyond the threshold range, a size of each photo preview control is adjusted, so that the ratio of the second height of each photo preview control to the screen height is within the threshold range. In addition, a gap between the photo preview controls may be further adjusted, so that the photo preview controls are more aesthetic.

In this way, compared with the user interface 500 shown in FIG. 7A, the user interface 510 shown in FIG. 7B neither lacks content information nor has a large image and a large font size, which can meet a use requirement of a user.

Figure 8A:
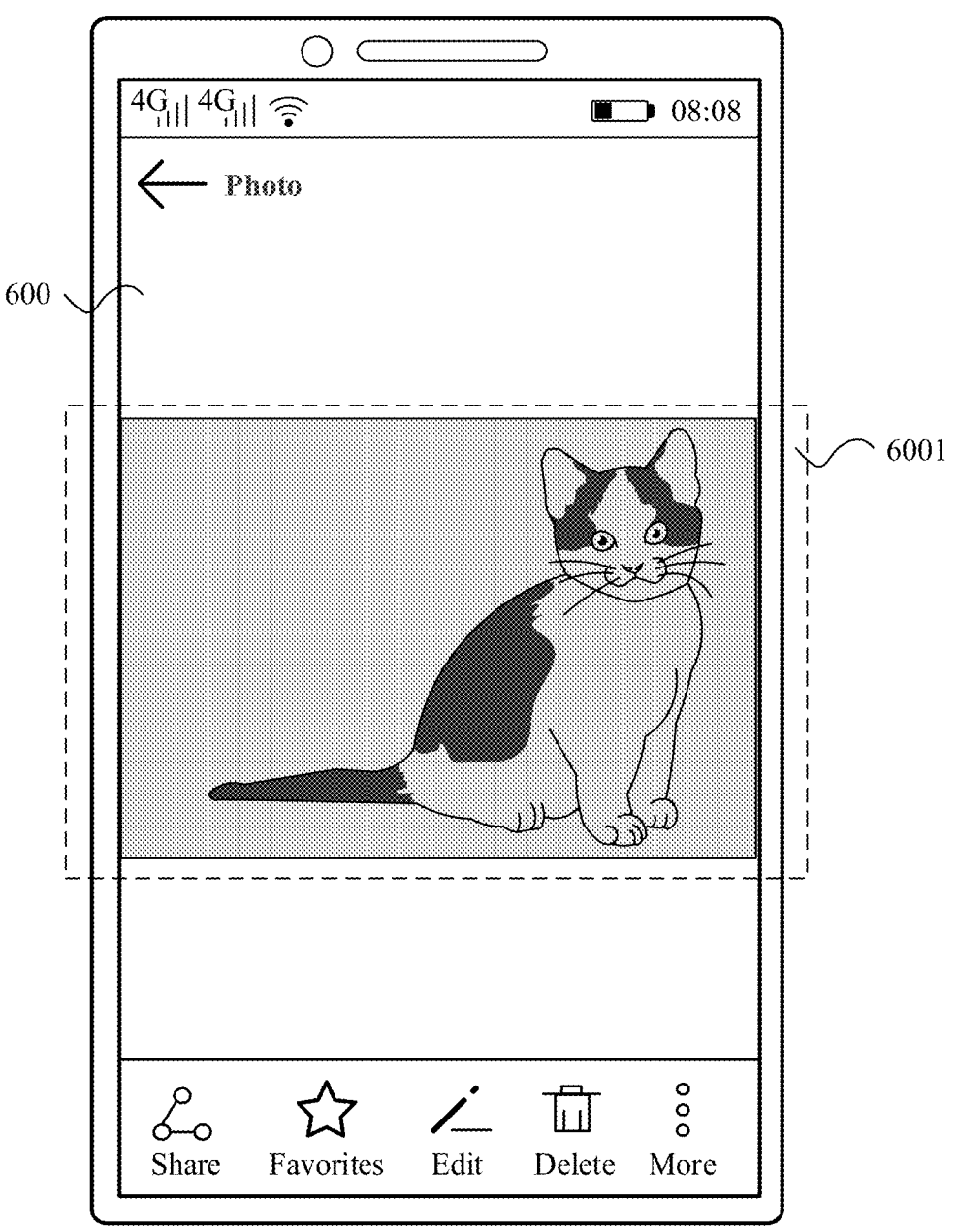
FIG. 8A and FIG. 8B are schematic diagrams of user interfaces of an immersive large image type according to an embodiment of this application.
Figure 8B:
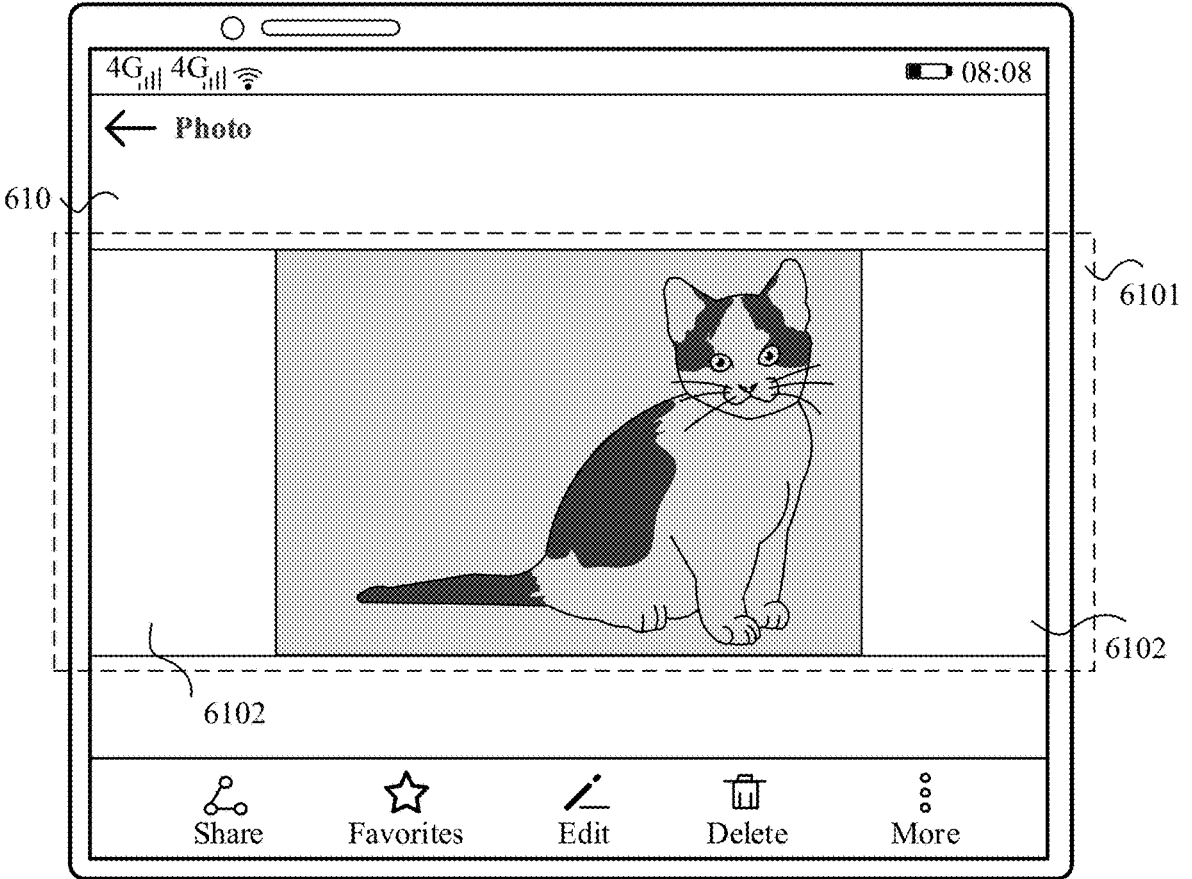

FIG. 8A and FIG. 8B show examples of a display method for a foldable screen according to an embodiment of this application in a full-screen picture view scenario.

As shown in FIG. 8A, when the foldable screen is in a folded state, a user interface 600 may be displayed on one of subscreens. The user interface 600 may be a user interface of a full-screen picture application. In some embodiments, a control layout type shown on the user interface 600 may be referred to as an immersive large image type.

In some implementations, the immersive large image type may be referred to as a large image type.

The user interface 600 may include a picture display area 6001. The picture display area 6001 is located in a center of a screen, a width of the picture display area 6001 may be a screen width, and a height of the picture display area 6001 may be less than a screen height. In response to an operation performed by a user on the picture display area 6001, the electronic device 100 may hide information other than the picture display area 6001, and display only the picture display area 6001.

As shown in FIG. 8B, when the foldable screen is switched from the folded state to an unfolded state, a plurality of subscreens on a same side of the electronic device 100 may jointly display the user interface 610. In this case, a picture display area 6101 is still displayed in the center of the screen. The electronic device 100 may adjust a size of the picture display area 6101 based on a threshold range that is of the immersive large image type and that is obtained through calculation. In other words, the electronic device determines whether a ratio of a first height of the picture display area 6101 to a screen height is within the threshold range. If the ratio is within the threshold range, a second height of the picture display area 6101 is the first height. If the ratio is beyond the threshold range, the size of the picture display area 6101 is adjusted, so that the ratio of the second height of the picture display area 6101 to the screen height is within the threshold range. In addition, blur processing may be performed on a background blur area 6102, so that the picture display area 6101 is not left white, and is more aesthetic.

In this way, compared with the user interface 600 shown in FIG. 8A, the picture display area 6102 of the user interface 610 shown in FIG. 8B is adaptively increased, but is not increased as large as the video playing area 2101 shown in FIG. 4B which is increased twice as large as the original one, thereby avoiding a phenomenon that an image control is excessively large.

Figure 9A:
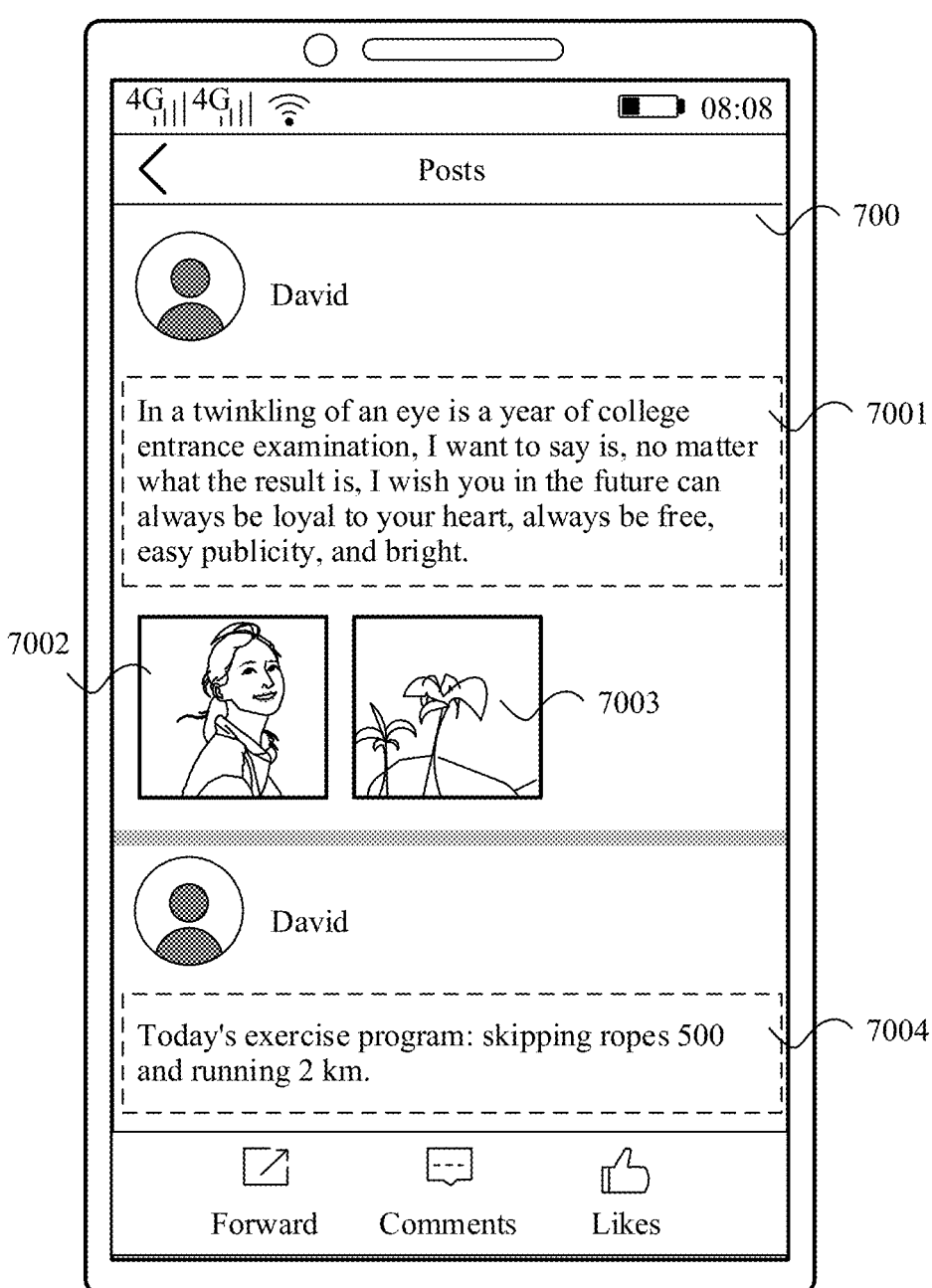
FIG. 9A and FIG. 9B are schematic diagrams of user interfaces of a social list type according to an embodiment of this application.
Figure 9B:
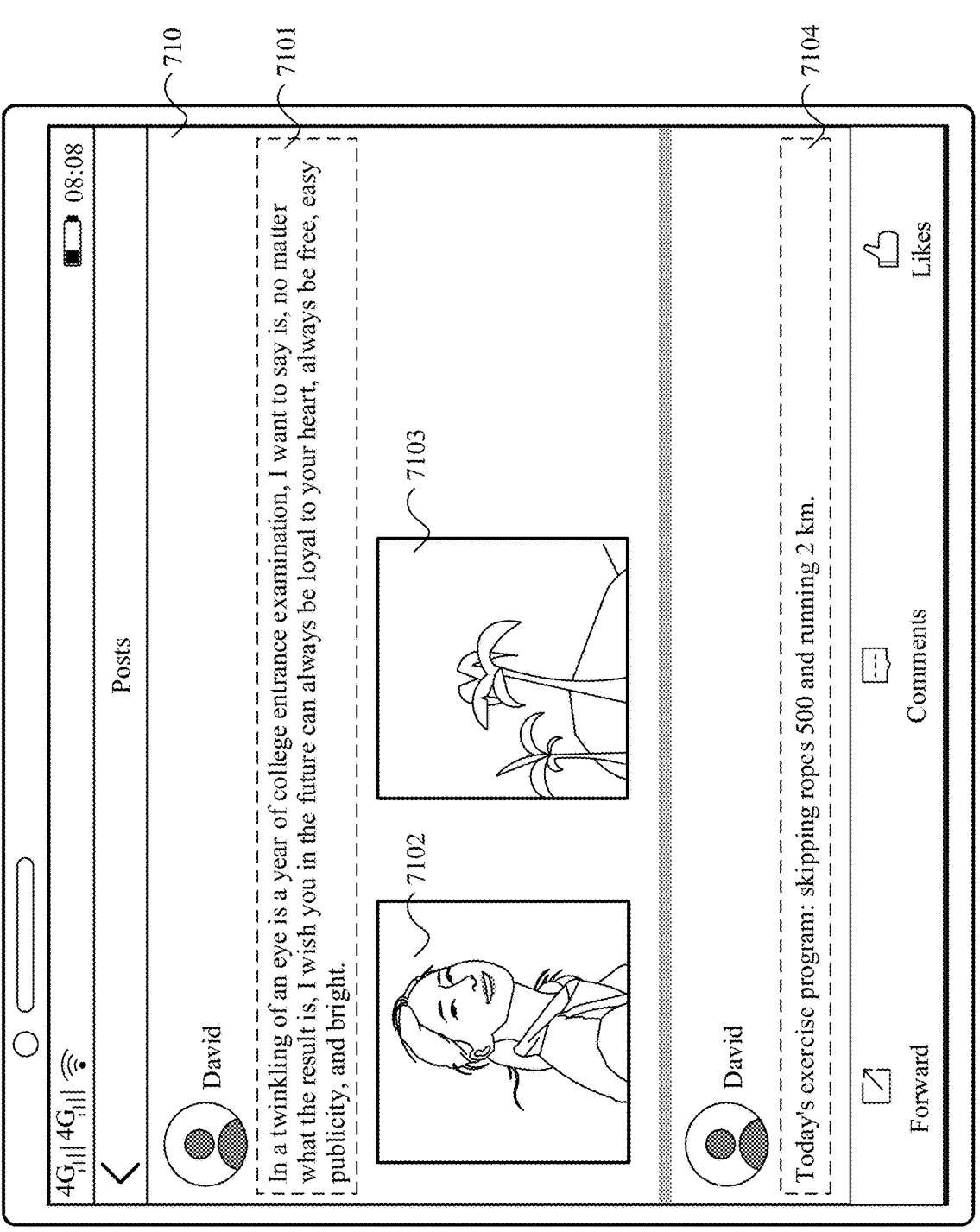

FIG. 9A and FIG. 9B show examples of a display method for a foldable screen according to an embodiment of this application in a post browsing scenario.

As shown in FIG. 9A, when the foldable screen is in a folded state, a user interface 700 may be displayed on one of subscreens. The user interface 700 may be a user interface of a post information browsing application. In some embodiments, a control layout type shown on the user interface 700 may be referred to as a social list type.

The user interface 700 may include a text control 7001, an image control 7002, an image control 7003, and a text control 7004.

The text control 7001 and the text control 7004 are displayed on a screen in a form of text, and widths and heights of the controls are related to a quantity of texts. As shown in FIG. 9A, widths of both the text control 7001 and the text control 7004 are a screen width, a height of the text control 7001 is a height of four lines of text, and a height of the text control 7004 may be a height of two lines of text. The electronic device responds to a tap operation of the user on the text control 7001 or the text control 7004, and may display an interface of pure text information corresponding to the text control 7001 or the text control 7004.

The image control 7002 and the image control 7003 are displayed below the text control 7001. The image control 7002 and the image control 7003 are arranged in a same row. The electronic device 100 may display, in response to a tap operation of the user on the image control 7002 or the image control 7003, an original photo or a full-screen photo corresponding to the image control 7002 or the image control 7003.

As shown in FIG. 9B, when the foldable screen is switched from the folded state to an unfolded state, a plurality of subscreens on a same side of the electronic device 100 may jointly display the user interface 710. In this case, on the user interface 710, the electronic device 100 uses the method that is applicable to a social list type and that the folded state and unfolded state are adaptive to a layout provided in this embodiment of this application, so that the text control 7101, the image control 7102, and the image control 7103 are shown in FIG. 9B. The electronic device 100 may adjust sizes of the text control 7101, the image control 7102, and the image control 7103 based on a threshold range of the social list type obtained through calculation.

Specifically, the electronic device 100 performs screen width adaptation processing on the text control 7101, so that a width of the text control 7101 may be a screen width, and a height of the text control 7101 is determined by a quantity of texts included in the text control 7101. That is, as shown in FIG. 9B, the height of the text control 7101 is a height of two lines of texts. Processing performed by the electronic device 100 on the text control 7104 is similar to that performed on the text control 7104. Details are not described herein again. A height of the text control 7104 is a height of a line of text.

The electronic device 100 determines whether a ratio of a first height of the image control 7102 to a screen height is within the threshold range. If the ratio is within the threshold range, a second height of the image control 7102 is the first height. If the ratio is beyond the threshold range, a size of the image control 7102 is adjusted, so that a ratio of the second height of the image control 7102 to the screen height is within the threshold range. Processing performed by the electronic device 100 on the image control 7103 is similar to that performed on the image control 7102. Details are not described herein again. The image control 7102 and the image control 7103 are still arranged in a same row.

Figure 10A:
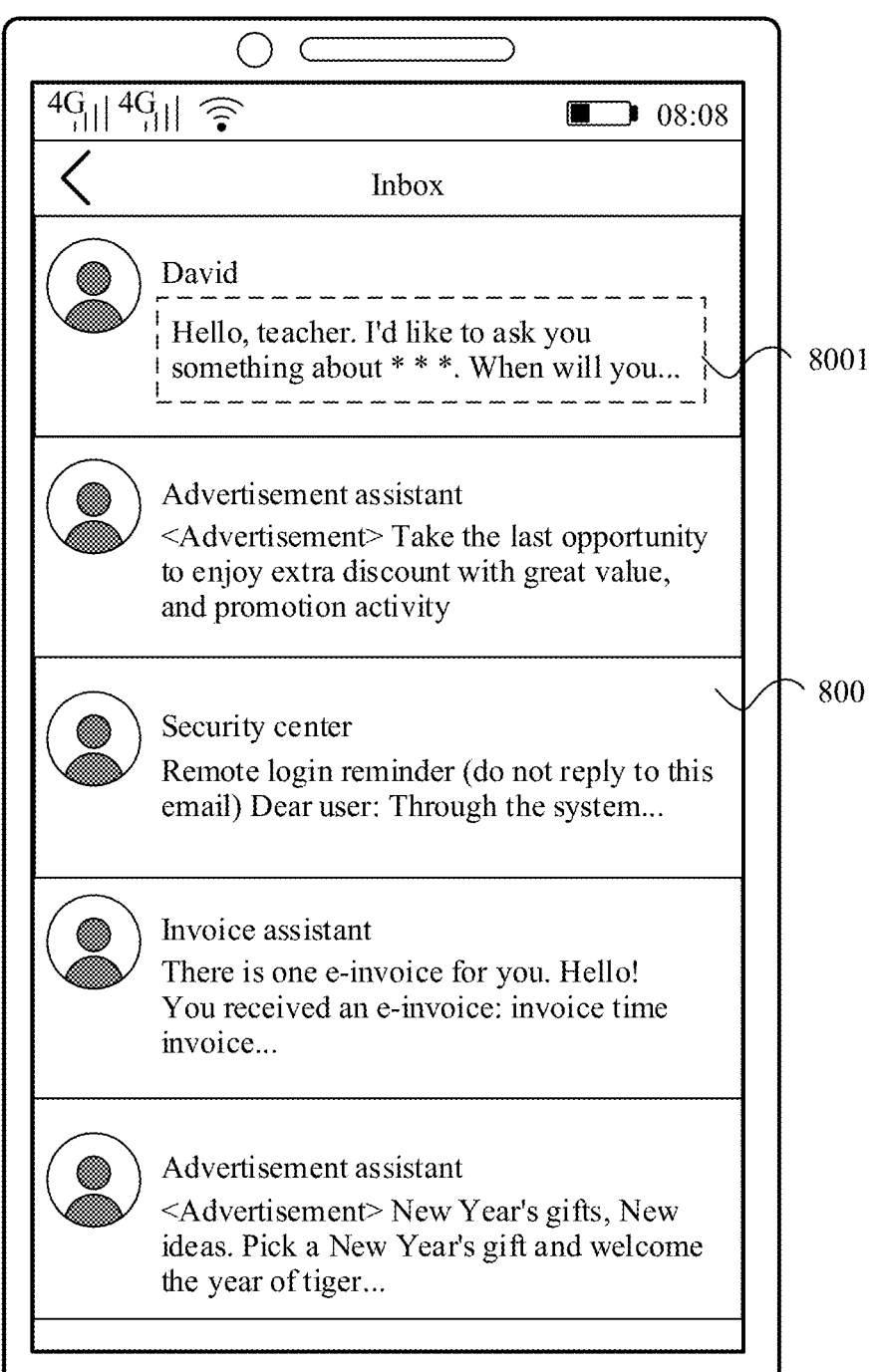
FIG. 10A and FIG. 10B are schematic diagrams of user interfaces of a text list type according to an embodiment of this application.
Figure 10B:
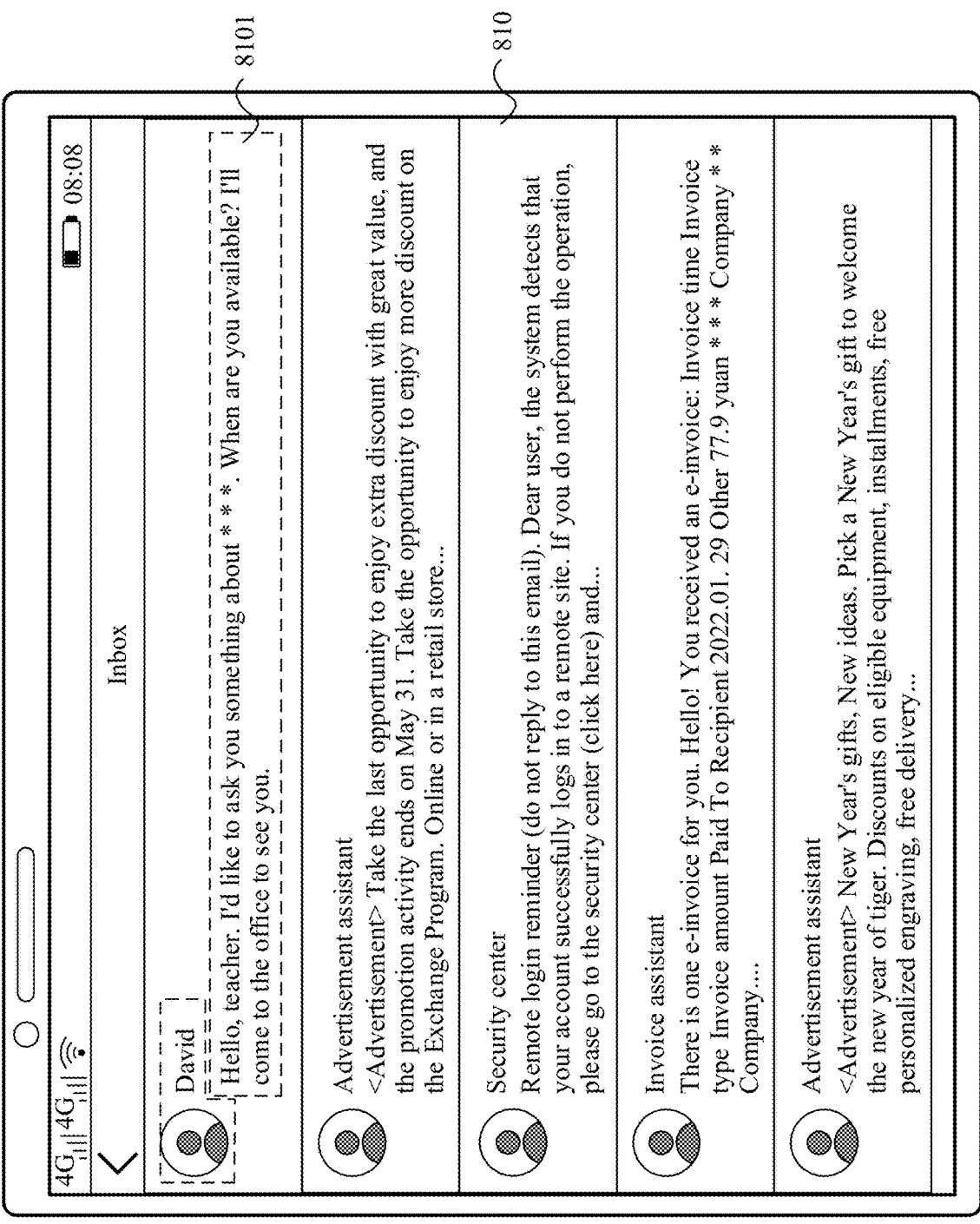

FIG. 10A and FIG. 10B show examples of a display method for a foldable screen according to an embodiment of this application in an email browsing scenario.

As shown in FIG. 10A, when the foldable screen is in a folded state, a user interface 800 may be displayed on one of subscreens. The user interface 800 may be a user interface of an email browsing application. In some embodiments, a control layout type shown on the user interface 800 may be referred to as a text list type.

The user interface 800 may include a content preview 8001. The content preview 8001 is displayed on the user interface 800 in a form of a text. A width and a height are fixed as shown in FIG. 10A. An electronic device 100 responds to an operation performed by a user on the content preview 8001, and may display detailed content of an email corresponding to the content preview 8001.

FIG. 10A shows an example of five mail boxes. The foregoing describes the content preview 8001 of a first mail box. Content preview parts included in other mail boxes are similar to the foregoing content preview 8001. Details are not described herein again.

As shown in FIG. 10B, when the foldable screen is switched from the folded state to an unfolded state, a plurality of subscreens on a same side of the electronic device 100 may jointly display the user interface 810. In this case, because the user interface 810 cannot lack information, a height of the content preview 8101 is the same as a height of the content preview 8001, and a width of the content preview 8101 adapts to a screen width in an unfolded state. However, optionally, the electronic device 100 may change a font size of a text displayed in the content preview 8101 to some extent.

In this way, compared with the user interface 800 shown in FIG. 10A, the user interface 810 shown in FIG. 10B does not lack mail list information, still displays five mail boxes, and may further display more mail boxes.

Figure 11A:
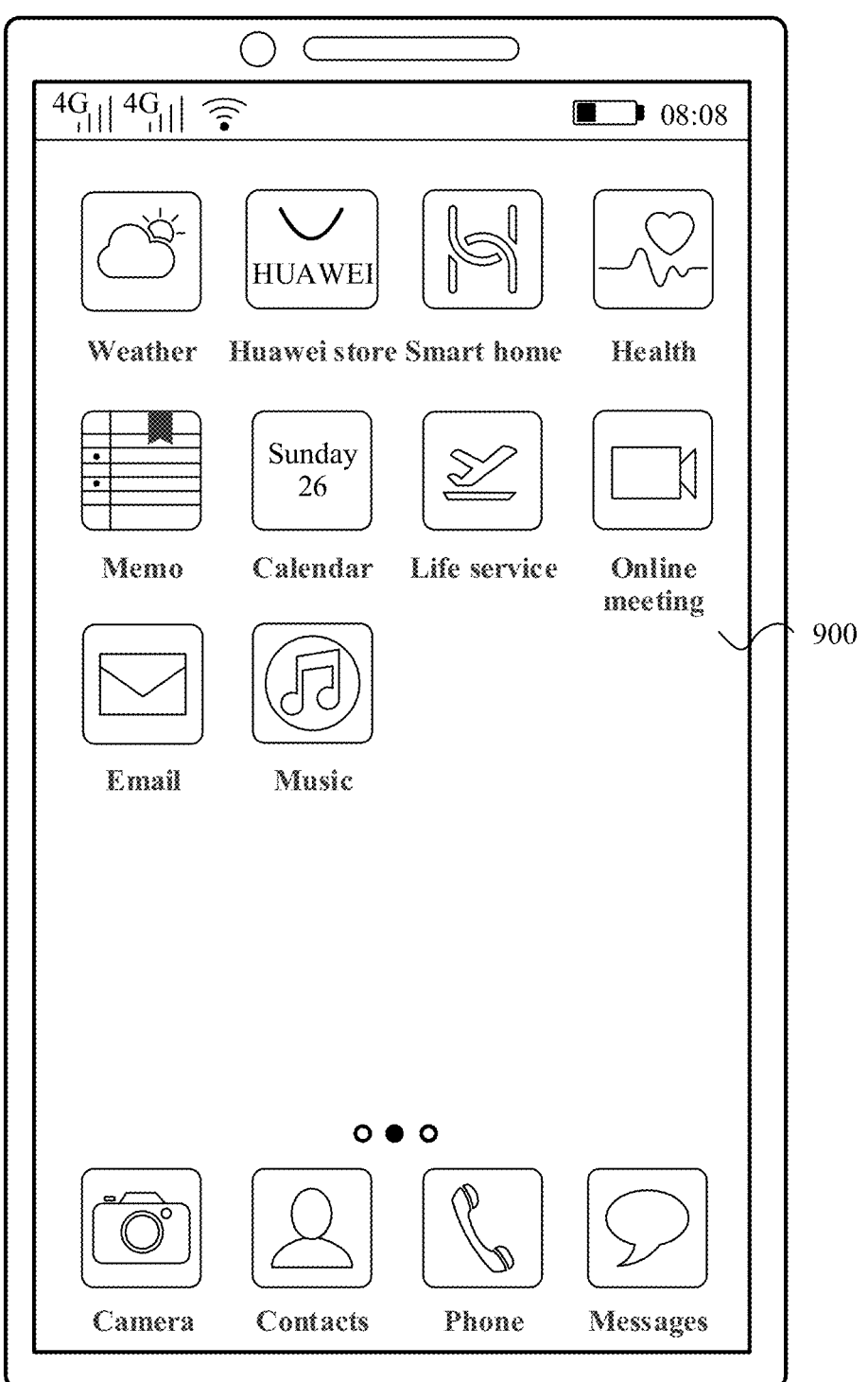
FIG. 11A and FIG. 11B are schematic diagrams of user interfaces of an application entry type according to an embodiment of this application.
Figure 11B:
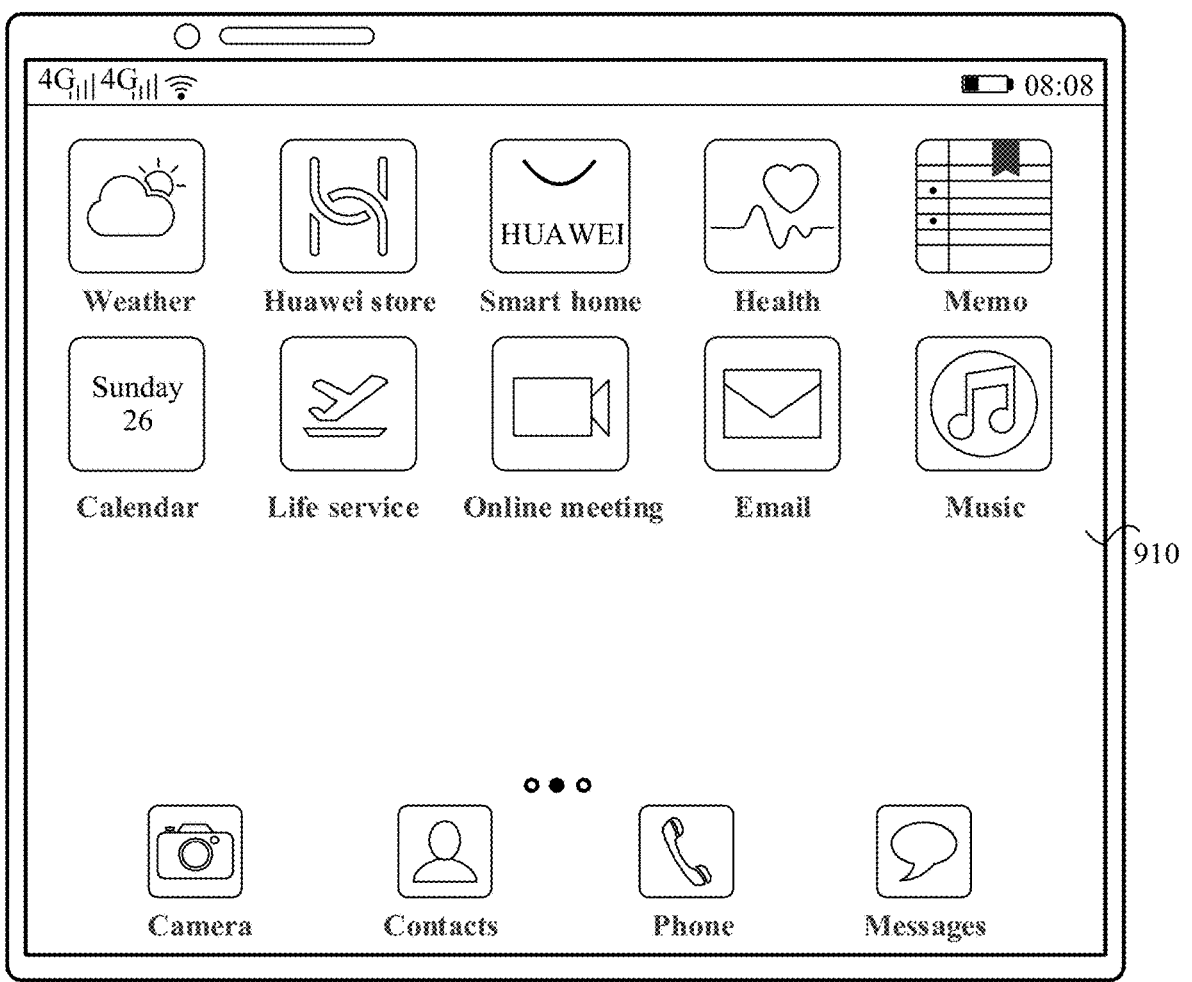

FIG. 11A and FIG. 11B show examples of a display method for a foldable screen according to an embodiment of this application in a home screen (Home Screen) scenario.

As shown in FIG. 11A, when the foldable screen is in a folded state, a user interface 900 may be displayed on one of subscreens. The user interface 900 may be a user interface of the home screen. In some embodiments, a control layout type shown on the user interface 900 may be referred to as an application entry type.

The user interface 900 may include a weather control, a Huawei store control, a smart home control, a health control, a memo control, a calendar control, a life service control, an online meeting control, an email control, a music control, and the like.

On the user interface 900, a maximum of four controls may be arranged in one row, four controls are arranged in a first row, four controls are arranged in a second row, and two controls are arranged in a third row. An electronic device 100 may display, in response to a tap operation of the user on each application control, a first interface of an application corresponding to each application control.

As shown in FIG. 11B, when the foldable screen is switched from the folded state to an unfolded state, a plurality of subscreens on a same side of the electronic device 100 may jointly display the user interface 910. In this case, a maximum of five controls may be arranged in one row of the user interface 910, five controls are arranged in a first row, and five controls are arranged in a second row. In addition, the controls are larger than the controls on the user interface 900, and an interval between the controls is also adaptively adjusted.

In this way, compared with the user interface 900 shown in FIG. 11A, the user interface 910 shown in FIG. 11B neither lacks content information nor has a large image and a large font size, which can meet a use requirement of a user.

With reference to FIG. 12, the following specifically describes a schematic flowchart of a method for adaptively adjusting an unfolded state layout of a foldable screen.

S1201: When an electronic device 100 is in a folded state, a user interface (for example, the user interface 700 shown in FIG. 9A) is displayed, and the user interface includes a plurality of interface elements.

The electronic device 100 needs to determine a control layout type to which the plurality of interface elements belong, so as to adjust a size of the interface element through subsequent classification.

The electronic device 100 may determine a control layout type of the electronic device 100 by using a type (namely, a text control, an image control, or the like) of an interface element on the user interface and a size of the interface element that are obtained by using an operating system.

In this embodiment of this application, based on a current control layout type of the electronic device 100, the control layout type of the electronic device 100 may be classified into five types: a content grid, an immersive large image, a social list, a text list, and an application entry.

A basis for determining, by the electronic device 100, that the control layout is a content grid type may be that interface elements are mainly distributed in a form of a grid image. For example, the interaction function bar 1002 shown in FIG. 3A and each photo preview control shown in FIG. 7A may belong to a content grid.

A basis for determining, by the electronic device 100, that the control layout is of the immersive large image type may be that the interface element is displayed in a form of an image, and a width of the interface element is approximately the same as a screen width. For example, both the video playing area 2001 shown in FIG. 4A and the picture display area 6001 shown in FIG. 8A may be the immersive large image.

The electronic device 100 may determine that the control layout is of the social list type based on one or more of the following: (1) The interface element is displayed in a form of a text in an upper part and an image in a lower part. (2) The interface element is displayed in a form of an image in an upper part and a text in a lower part. For example, the text control 7001, the image control 7002, and the image control 7003 shown in FIG. 9A may all belong to a social list.

The electronic device 100 may determine that the control layout is of a text list type based on one or more of the following: (1) The interface element is displayed in a form of a text. (2) The interface element is displayed in a form of a left half part being an image, a right half part being a text, and a size of the image is less than 40 dp. (3) The interface element is displayed in a form of a left half part being a text and a right half part being an image, and a size of the image is less than 40 dp. For example, the mail box shown in FIG. 10A may belong to a text list.

The electronic device 100 may determine that the control layout is of an application entry type based on one or more of the following: (1) The interface element is displayed in a form of an image in an upper part and a text in a lower part, and a size of the image is less than 40 dp. (2) The interface element is displayed in a form of an image, and a size of the image is less than 40 dp. For example, each control shown in FIG. 11A may belong to an application entry.

In this embodiment of this application, the foregoing basis condition for determining the control layout type is not limited, and may further include more or fewer basis conditions.

S1202: The electronic device 100 switches from the folded state to an unfolded state, sets a height of the interface element in the unfolded state to a first height h, and sets a width of the interface element in the unfolded state to a first width B. The electronic device 100 determines whether the first height h is qualified, that is, determines whether a ratio a of the first height h to an expansion height H is not greater than a threshold b.

Before determining whether the first height h is qualified, the electronic device 100 needs to obtain the first height h in the unfolded state. When an interface displayed by the electronic device 100 is an interface of an application of the electronic device 100, an operating system in the electronic device 100 may directly obtain, through calculation based on the height of the interface element in the folded state, the first height h of the interface element in the unfolded state. When an interface displayed by the electronic device 100 belongs to an interface of a third-party application downloaded by the electronic device 100, an operating system in the electronic device 100 may obtain the first height h of the interface element in the unfolded state based on information carried in the third-party application.

For example, a parent view in the electronic device 100 queries, based on a current state (the folded state or the unfolded state) of a screen, a space size required by a child view. The child view calls onMeasue to measure data of the current view based on the screen state to obtain a width and a height of the screen. Then, the child view calls MeasureSpec to determine a mode and a size, so as to obtain a height and a width of the interface element that are set in the folded state and the unfolded state. In this embodiment of this application, a manner of setting the height and the width of the interface element at a system layer of the electronic device 100 is not limited.

In some embodiments, the electronic device 100 may obtain a height of each interface element in the folded state. In this case, when the electronic device 100 is switched to the unfolded state, the electronic device 100 sets controls of the interface elements, so as to obtain the first height h. It should be noted that, the first height h is not a height of an interface element displayed on the screen of the electronic device 100 in the unfolded state, but is obtained by the electronic device 100 by preliminarily adjusting the height of each interface element based on a screen width change. Subsequently, a first height h after initial adjustment is further adjusted, that is, it is determined whether a ratio a of the first height h to the expansion height H is not greater than the threshold b.

The threshold b is obtained by using a large amount of experimental data. The experiment may be: on a premise that content information displayed by the electronic device 100 in the unfolded state is not lost compared with that in the folded state, the user evaluates heights in the five designed control layout types. For example, for a control layout of a text type, when a ratio of a height of an interface element to a screen height is 1/6, 75% of users performing an experiment consider that a current height of the interface element is the most appropriate. In this case, the threshold b of the text type may be set to 1/6. In other words, when the ratio of the height of the interface element to the screen height is greater than 1/6, 75% of users performing the experiment consider that the interface element is a large text or a large image. In this embodiment of this application, a specific manner of obtaining the threshold b is not limited, and user evaluation in another manner may further exist. The foregoing is merely an example for description.

The electronic device 100 may obtain the first height h of the five control layout types in the unfolded state, the expansion height H of the electronic device 100, and the threshold b of the five control layout types, calculate a ratio a of the first height h to the expansion height H, and determine whether the ratio a is not greater than the threshold b of the corresponding control layout type.

When the ratio a is not greater than the threshold b, it indicates that the first height h meets a user requirement, that is, the first height h is qualified. In this case, the electronic device 100 performs step S1203.

When the ratio a is greater than the threshold b, it indicates that the first height h does not meet a user requirement, that is, the first height h is unqualified. In this case, the electronic device 100 performs step S1204.

S1203: The electronic device 100 displays, in the unfolded state, an interface element having the first height h and a first width B.

In some embodiments, after determining that the ratio a of the first height h to the expansion height H of the electronic device 100 is not greater than the threshold b, the electronic device 100 may determine the height of the interface element displayed in the unfolded state as the first height h. It should be noted that, because the ratio a is not greater than the threshold b, the control with the first height h displayed by the electronic device 100 may meet the user requirement, and does not belong to a phenomenon of a large image and a large text. Optionally, a layout of controls that are displayed by the electronic device 100 and that have the first height h may be arranged based on an expansion proportion of a screen width. In this embodiment of this application, an arrangement layout of the controls is not limited herein, and there may be another arrangement layout.

S1204: The electronic device 100 displays, in the unfolded state, an interface element having a second height h' and a second width B'.

In some embodiments, after determining that the ratio a of the first height h to the expansion height H of the electronic device 100 is greater than the threshold b, the electronic device 100 may determine a value of the second height h', so that a ratio a' of the second height h' to the expansion height H is not greater than the threshold b. It should be noted that, because the ratio a is greater than the threshold b, if the electronic device 100 does not perform adjustment, but displays an interface element having the first height h, the interface element does not meet the user requirement, and belongs to a phenomenon of a large image and a large text. Therefore, the displayed second height h' needs to be adjusted to obtain.

The following specifically describes how to adjust the first height h to obtain the second height h' of the control by using an example in which the control layout type is an immersive large image (referring to FIG. 8A and FIG. 8B). For example, a folding width of the electronic device 100 is 750 dpx, and a folding height is 1600 dpx. An expansion width of the electronic device 100 is 1500 dpx, and an expansion height His 1600 dpx. Through experiments, the electronic device 100 may obtain that the threshold b of the immersive large image is ½. The electronic device 100 may obtain that the first width B in the unfolded state is approximately the same as the expansion width, that is, 1400 dpx, and the first height h in the unfolded state is 1000 dpx. In this case, the ratio a of the first height h to the expansion height H is 5/8, and the ratio a is greater than the threshold b and is not within the range of the threshold b. The electronic device 100 needs to obtain the second height h' by adjusting the first height h, so that the ratio a' is less than or equal to the threshold b. When the second height h' is 800 dpx, the ratio a' of the second height h' to the expansion height H is 1/2, and the ratio a' is equal to the threshold b. Therefore, the electronic device 100 may adjust the second height h' to 800 dpx.

Further, when adjusting the second height h' of the displayed interface element, the electronic device 100 also needs to adjust the second height h' to obtain the second width B' of the interface element, so that the interface element is displayed more aesthetically. In some implementations, the second width B' may adjust, by using a same variation proportion, the first width B based on a variation proportion of the second height h' to the first height h. Optionally, the second width B' may also be changed at a same proportion for the first width B based on a variation proportion of the screen width. That is, the second width B' may be adapted to the screen width for change. Adjustment of the second width B' of the control is not described in detail herein, and reference may be made to the following detailed description of the five control layouts.

The following describes how to adjust a control size in the five control layouts: the content grid, the immersive large image, the social list, the text list, and the application entry.

(1) Content Grid

When the control layout displayed by the electronic device 100 is the content grid, the electronic device 100 obtains a first height h1, a first width B1, and a threshold b1 of each interface element. The electronic device 100 obtains, through calculation, a ratio a1 of the first height h1 to the expansion height H, where the ratio a1 is greater than the threshold b1. Then, the electronic device 100 adjusts a second height h1', so that a ratio a1' of the second height h1' to the expansion height His less than or equal to the threshold b1.

In some embodiments, the electronic device 100 may obtain the threshold b1 through calculation based on a large number of experiments of using the control by the user. Specifically, when an interface element of the content grid type is a wide-shaped picture or a square card, that is, the first width is less than or equal to 1.2 times of the first height, the threshold b1 obtained by the electronic device 100 through calculation may be ¼. When an interface element of the content grid type is a rectangular control, that is, the first width is greater than 1.2 times of the first height, the threshold b1 obtained by the electronic device 100 through calculation may be 1/2.5.

After adjusting the second height h1' based on the threshold b1, the electronic device 100 also needs to adjust the second width B1'.

In some embodiments, because the interface element in the content grid type is displayed in a form of an image, the second width B1' may be obtained through calculation according to the following formula:

$$B1' = B1 * (h1'/h1), \qquad (1)$$

the formula (1) indicates that the width changes proportionally based on a height change proportion. That is, the second height h1' is reduced by h1'/h1 relative to the first height h1, and the second width B1' is also reduced by h1'/h1 relative to the first width B1. Because the electronic device 100 may obtain the first width B1, the first height h1, and the second height h1', the second width B1' may be calculated according to the formula (1).

Because the electronic device 100 may display interface elements of a plurality of content grid types in the unfolded state, a layout of each interface element needs to be considered.

Figure 13:
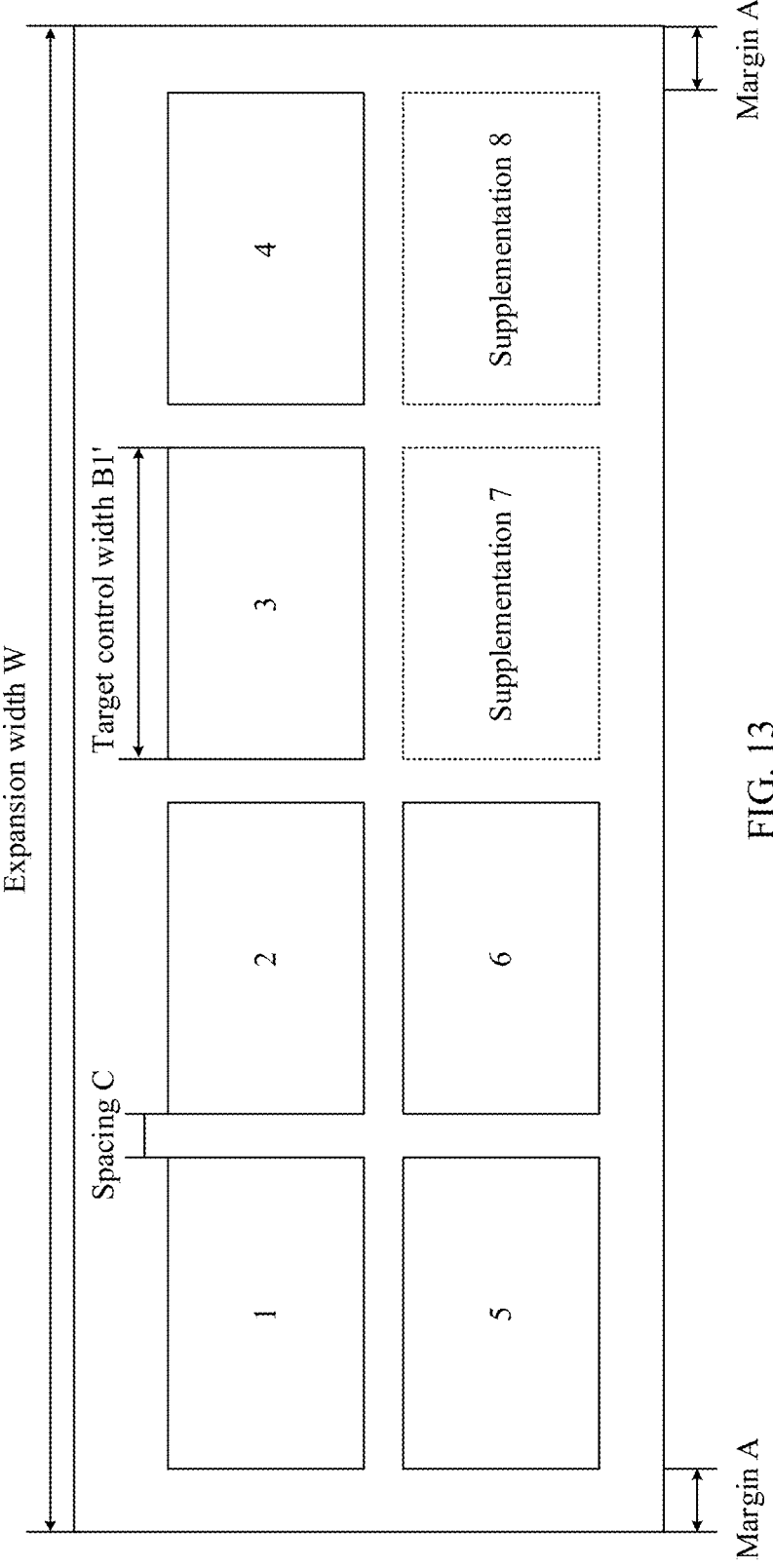
FIG. 13 is a schematic diagram of a layout of a content grid type according to an embodiment of this application.

For example, refer to a schematic diagram of a grid layout shown in FIG. 13. The electronic device 100 may perform layout design on controls of a plurality of content grids based on the following grid layout parameter relationship:

$$W = 2A + n * B1' + (n - 1) * C \qquad (2)$$

As shown in FIG. 13, W represents a screen width of the electronic device 100 in the unfolded state, that is, an expansion width W. A represents a width between an interface element that is displayed closest to an edge of the screen and that is in the electronic device 100 and the edge of the screen, that is, a margin A. n represents a quantity of columns of interface elements of the content grid type displayed on the electronic device 100, for example, the quantity n of columns shown in FIG. 13 is 4. B1' represents a second width calculated by the electronic device 100 according to the foregoing formula (1). C represents a spacing width between every two columns of interface elements displayed in the electronic device 100, that is, a spacing C. The electronic device 100 may implement the control layout in FIG. 13 according to formula (2).

Further, the expansion width W is a known fixed value, and the margin A that is generally set by the electronic device 100 is also a known fixed value. It can be learned from the foregoing parameter description that the expansion width W, the margin A, and the second width B1' in the formula (2) are known, the column quantity n and the spacing C are unknown, and the column quantity n needs to be an integer. Specifically, a quantity n of columns may be obtained by dividing W−2A by B1' and rounding, and then a remainder obtained by dividing W−2A by B1' is divided into n−1 parts, to obtain the spacing C. In this embodiment of this application, when a total spacing (n−1)*C between the interface elements in the electronic device 100 is greater than the second width B1', another manner may be further used for design layout. This is not limited herein.

For example, as shown in FIG. 13, it is known that the expansion width W is 1500 dpx, the margin A is 50 dpx, and the second width B1' is 320 dpx. The electronic device 100 may obtain, according to the foregoing rounding manner, that the column quantity n is 4 and the foregoing modulo manner, that the spacing C is 40 dpx.

Further, if a quantity of interface elements that can be placed and that are calculated by the electronic device 100 according to the formula (2) is greater than a quantity of interface elements that are of the content grid type and that are displayed in a folded state, and it is detected that the electronic device 100 can respond to a user operation in the folded state, remaining interface elements of different content grid types are displayed. In this case, an interface element may be supplemented to a position of an interface element of the content grid type that can be placed. For example, as shown in FIG. 13, the electronic device 100 may display six interface elements in the folded state. The electronic device 100 responds to a sliding operation performed by the user on a screen, and may display a supplement 7 and a supplement 8. Therefore, after calculation according to the formula (2), the electronic device 100 may supplement an interface element 7 to the second column and the third row, and supplement an interface element 8 to the second column and the third row in the unfolded state.

(2) Immersive Large Image

When the control layout displayed by the electronic device 100 is the immersive large image, the electronic device 100 obtains a first height h2, a first width B2, and a threshold b2 of the interface element. In some embodiments, the electronic device 100 may obtain, through calculation, that the threshold b2 is ½ based on a large quantity of experiments of using the control based on user experience. In this embodiment of this application, a value of the threshold b2 is not limited.

The electronic device 100 calculates that a ratio a2 of the first height h2 to an expansion height H is greater than the threshold b2. The electronic device 100 adjusts a second height h2', so that a ratio a2' of the second height h2' to the expansion height H is less than or equal to the threshold b2.

In some embodiments, a display size of the interface element of the immersive large image type and a position of the interface element on the screen of the electronic device 100 may include the following two manners.

Manner A: Blur Background

Refer to the user interface 610 shown in FIG. 8B. FIG. 8B shows an example of an effect diagram of a scenario in which the electronic device 100 performs background blur processing on a picture display area 6101 of an immersive large image type. The following describes in detail how to specifically implement a method for blurring a background.

Figure 14A:
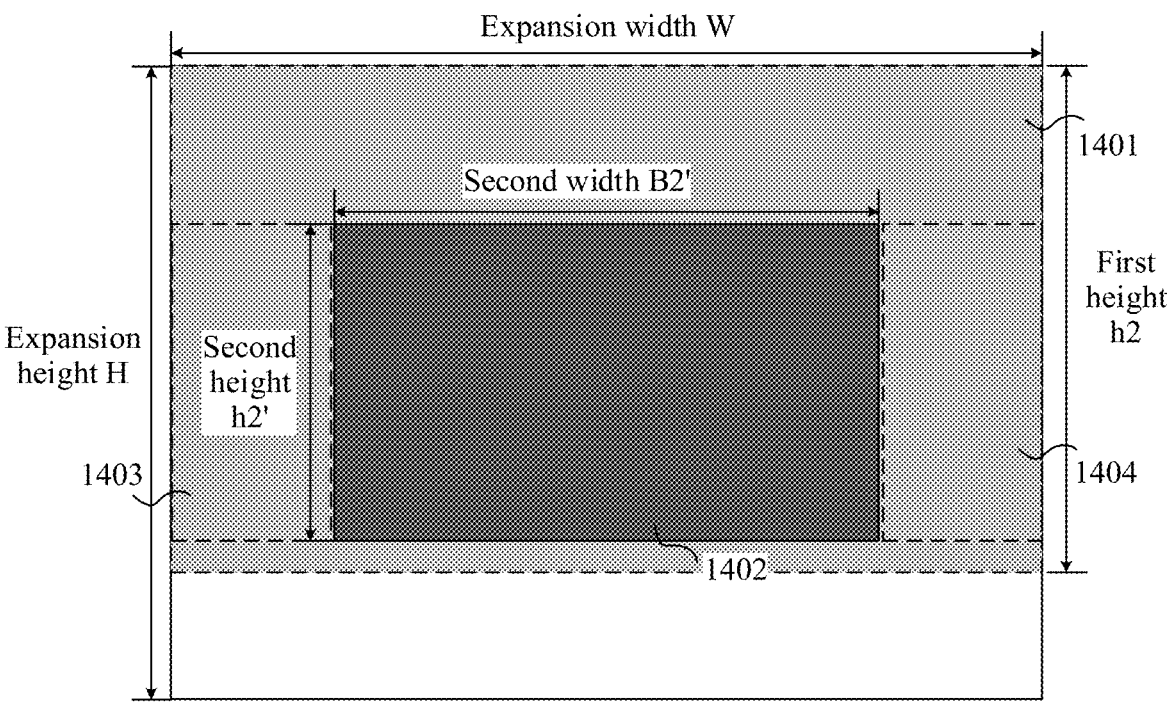
FIG. 14A and FIG. 14B are schematic diagrams of a layout of an immersive large image type according to an embodiment of this application.

FIG. 14A is a schematic diagram of an example of a method for performing background blurring on an interface element of an immersive large image type. As shown in FIG. 14A, a rectangular dashed-line box 1401 (namely, a light gray rectangular area) represents an area that is adjusted by the electronic device 100 and that is displayed by an interface element having a first width and a first height. It should be noted that the electronic device 100 does not display the rectangular dashed-line box 1401 on a screen in an unfolded state. FIG. 14A is merely used to better describe how to perform background blur processing. A rectangular solid-line box 1402 represents an area that is displayed by an interface element having a second width and a second height and that is further adjusted by the electronic device 100. The electronic device 100 knows an expansion width W, a first height h2, and a first width B2.

In some embodiments, because a ratio of the first height h2 to an expansion height H is greater than a threshold b2, the electronic device 100 adjusts a second height h2', so that a ratio of the second height h2' to the expansion height H is less than or equal to the threshold b2. For example, when the threshold b2 is ½, the second height h2' may be 0.5 times of the expansion height H.

After adjusting the second height h2' based on the threshold b2, the electronic device 100 also needs to adjust the second width B2'. For example, the second width B2' may be obtained through calculation according to the following formula:

$$B2' = B2 * (h2'/h2), \qquad (3)$$

where the formula (3) indicates that the width may change proportionally based on a height change proportion. Refer to the foregoing detailed description of formula (1). Details are not described herein again. In some embodiments, when the interface element is of the immersive large image type, a first width B2 may be equal to the expansion width W in terms of a numerical value.

After obtaining the second height h2' and the second width B2' through calculation, as shown in FIG. 14A, the electronic device 100 may display the interface element in the middle, and perform background blur processing on a dashed-line box 1403 and a dashed-line box 1404. In some embodiments, the electronic device 100 may obtain a background image of an interface element, and perform background blur processing on an area from a left edge and a right edge of the interface element to a left edge and a right edge of the screen.

In this way, the electronic device 100 performs background blur processing, and this helps improve visual perception of the user, and can avoid a blank area, thereby affecting user experience.

Manner B: Copping Processing

Figure 14B:
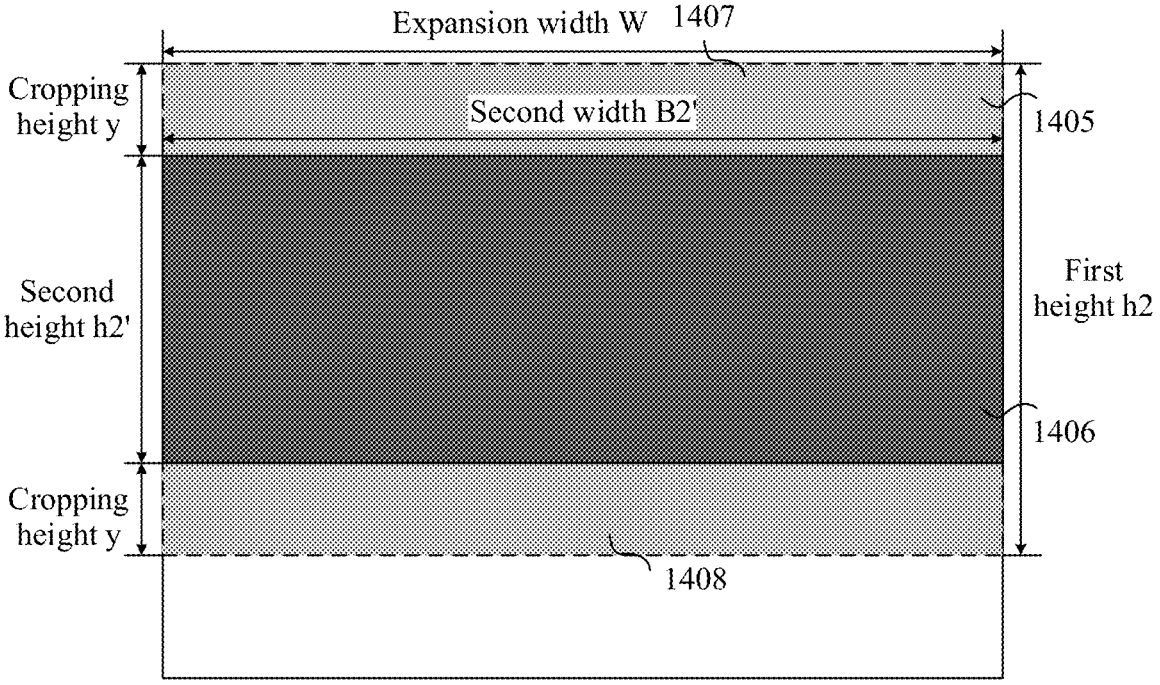

FIG. 14B is a schematic diagram of an example of a method for performing cropping processing on a control of an immersive large image type. As shown in FIG. 14B, a rectangular dashed-line box 1405 represents an area that is adjusted by the electronic device 100 and that is displayed by an interface element having a first width and a first height. The rectangular dashed-line box 1405 represents an area that is displayed by an interface element having a second width and a second height and that is further adjusted by the electronic device 100. The electronic device 100 knows an expansion width W, a first height h2, and a first width B2.

In a possible embodiment, the electronic device 100 adjusts a second width B2' to be consistent with the first width B2. In addition, the second height h2' is adjusted, so that a ratio a2' of the second height h2' to an expansion height H is less than or equal to a threshold b2.

The manner B of displaying the interface element is different from the manner A. The electronic device 100 performs cropping processing on the rectangular dashed-line box 1405 to obtain the rectangular dashed-line box 1405. Specifically, the electronic device 100 cuts off, for an upper part of the rectangular dashed-line box 1405, a cropping area 1407 whose cutting height is y and whose cutting width is B2'. The electronic device 100 cuts off, for a lower part of the rectangular dashed-line box 1405, a cropping area 1408 whose cutting height is y and whose cutting width is B2'. The electronic device 100 can display an area (namely, a rectangular solid-line box 1406) displayed by an interface element having a second width and a second height and that is shown in FIG. 14B. The cropping height y may be 0/5 times of a difference between the first height h2 and the second height h2'. The electronic device 100 may display the rectangular solid-line box 1406 in the center of the rectangular dashed-line box 1405, as shown in FIG. 14B, or may display the rectangular solid-line box 1406 in the center of the screen of the electronic device 100. This is not limited.

In this embodiment of this application, a display manner of the control of the immersive large image type is not limited to the foregoing manner A and manner B, and there may be another display manner. This is not limited herein.

(3) Social List

In a possible implementation, when a control layout type displayed by the electronic device 100 is a social list, the electronic device 100 needs to divide the interface elements into an image control and a text control for processing separately.

When the electronic device 100 adjusts the image control, the electronic device 100 obtains a first height h3, a first width B3, and a threshold b3 of the image control. The electronic device 100 obtains, through calculation, a ratio a3 of the first height h3 to the expansion height H, where the ratio a3 is greater than the threshold b3. Then, the electronic device 100 adjusts a second height h3', so that a ratio a3' of the second height h3' to the expansion height His less than or equal to the threshold b3. In some embodiments, the electronic device 100 may obtain, through calculation, that the threshold b3 is ¼ based on a large quantity of experiments of using the control based on user experience. In this embodiment of this application, a value of the threshold b3 is not limited.

After adjusting the second height h3' of the image control based on the threshold b3, the electronic device 100 also needs to adjust the second width B3'. For example, the second width B3' may be obtained through calculation according to the following formula:

$$B3' = B3 * (h3'/h3), \qquad (4)$$

where the formula (4) indicates that the width may change proportionally based on a height change proportion. Refer to the foregoing detailed description of formula (1). Details are not described herein again.

In a possible implementation, when the image control in the social list type meets the foregoing condition for supplementing the interface element of the content grid type, the image control in the social list type may also be supplemented. This is not limited herein.

When the electronic device 100 adjusts the text control, the electronic device 100 may adjust a text font size in the text control, or only adaptively adjust a text font size, for example, increase a font size. In this embodiment of this application, adjustment of a text font size is not limited. When a width of the text control in a folded state obtained by the electronic device 100 is less than a folded width, that is, when a quantity of texts in the text control is small and a row is not be filled, the electronic device 100 adjusts the second width of the text control to be still the width in the folded state. When a width of the text control in a folded state obtained by the electronic device 100 is equal to a folded width, that is, when a quantity of texts in the text control is large, and one row or even a plurality of rows can be filled, the electronic device 100 adjusts the second width of the text control based on the quantity of texts in the text control. If the quantity of texts in the text control is sufficient to fill a line of a screen in an unfolded state, the second width of the text control may be an expansion width. If the quantity of texts in the text control is not large enough to fill a line of a screen in an unfolded state, the second width of the text control may be a width occupied by the quantity of texts in the text control.

In the unfolded state, the electronic device 100 may display the image control and the text control in a layout manner in the folded state. Specifically, if a control layout of the social list type in the folded state is that the text control is above the image control, a control layout of the social list type in the unfolded state is also that the text control is above the image control. If a control layout of the social list type in the folded state is that the text control is below the image control, a control layout of the social list type in the unfolded state is also that the text control is below the image control. For example, for a layout of the electronic device 100 in the unfolded state, refer to the user interface 710 shown in FIG. 9B.

(4) Text List

In a possible implementation, when a control layout type displayed by the electronic device 100 is the text list, the electronic device 100 needs to adjust a size of an interface element that is associated with an image control and a text control as a text list type. For example, as shown in FIG. 10B, the electronic device 100 processes an email box as an interface element.

When the control layout type displayed by the electronic device 100 is the text list, the electronic device 100 obtains a first height h4, a first width B4, and a threshold b4 of each displayed interface element. The electronic device 100 obtains, through calculation, a ratio a4 of the first height h4 to an expansion height H, where the ratio a4 is greater than the threshold b4. Then, the electronic device 100 adjusts a second height h4', so that a ratio a4' of the second height h4' to the expansion height H is less than or equal to the threshold b4. In some embodiments, the electronic device 100 may obtain, through calculation, that the threshold b4 is ⅙ based on experiments. In this embodiment of this application, a value of the threshold b4 is not limited.

After adjusting the second height h4' of the interface element based on the threshold b4, the electronic device 100 also needs to adjust a second width B4'. For example, the second width B4' may be obtained through calculation according to the following formula:

$$B4' = B4 * (h4'/h4), \qquad (5)$$

where
the formula (5) indicates that the width may change proportionally based on a height change proportion. Refer to the foregoing detailed description of formula (1). Details are not described herein again.

In some embodiments, the electronic device 100 may display more interface elements of the text list type in an unfolded state than in a folded state. For example, the electronic device 100 can display only five interface elements in the folded state, but in the unfolded state, because the text control is stretched, six interface elements can be displayed on a screen.

Further, a second height and a second width of the image control included in the interface element of the text list type may also be adjusted according to the foregoing method and formula (5). For a manner in which the electronic device 100 adjusts the text control included in the interface element of the text list type, refer to the foregoing adjustment manner for the text control in the social list type. Details are not described herein again.

(5) Application Entry

When a control layout type displayed by the electronic device 100 is the application entry, the electronic device 100 obtains a first height h5, a first width B5, and a threshold b5 of an interface element. In some embodiments, the electronic device 100 may obtain, through calculation, that the threshold b5 is ⅙ based on a large quantity of experiments of using the control based on user experience. In this embodiment of this application, a value of the threshold b6 is not limited.

The electronic device 100 calculates that a ratio a6 of the first height h6 to an expansion height H is greater than the threshold b6. The electronic device 100 adjusts a second height h6', so that a ratio a6' of the second height h6' to the expansion height H is less than or equal to the threshold b6.

After adjusting the second height h5' of the image control based on the threshold b5, the electronic device 100 also needs to adjust the second width B5'. For example, the second width B5' may be obtained through calculation according to the following formula:

$$B5' = B5 * (h5'/h5), \qquad (6)$$

where
the formula (6) indicates that the width may change proportionally based on a height change proportion. Refer to the foregoing detailed description of formula (1). Details are not described herein again.

After determining a second height h5' and the second width B5' of the interface element of the application entry type, the electronic device 100 may perform a corresponding layout on the interface element. For example, the electronic device 100 may appropriately increase a spacing between interface elements, so that spacings between interface elements in each row displayed on a screen are consistent, and the interface elements are displayed symmetrically, evenly, and aesthetically. Specifically, refer to the user interface 910 shown in FIG. 11B.

It should be noted that an application scenario in this embodiment of this application is not limited to an application scenario in which the electronic device 100 is switched from a folded state to an unfolded state, or may be an application scenario in which the electronic device 100 is started, that is, the electronic device 100 is in an unfolded state. This embodiment of this application may further include more or less application scenarios in which embodiments of this application can be applied. In other words, in the flowchart of the method for adaptively arranging an unfolded state layout of a foldable screen shown in FIG. 12, S1201 and the step of switching the electronic device 100 from the folded state to the unfolded state are optional steps.

According to the foregoing method, the electronic device 100 may obtain, through calculation based on user experience, a threshold of a ratio of a height to a screen height, and design that a ratio of a second height of the interface element to a screen height is less than the threshold. In this way, a phenomenon that a large image and a large font size appear in the electronic device 100 in the unfolded state can be effectively reduced, and a use habit of the user can be complied with, thereby improving user experience. In addition, a phenomenon that a content information amount in the unfolded state of the electronic device 100 is less can be further reduced, to further improve user experience. In the foregoing method, the second height of the interface element may alternatively be designed adaptively, and a developer does not need to manually design the size and layout of the interface element in the unfolded state in an application development stage, and this reduces workload of the developer.

Control layout types of the user interfaces in the foregoing embodiments in FIG. 7A and FIG. 7B, FIG. 8A and FIG. 8B, FIG. 9A and FIG. 9B, FIG. 10A and FIG. 10B, and FIG. 11A and FIG. 11B are simple. However, in actual application, in most cases, one user interface covers a plurality of control layout types. The following uses two examples to describe how to adjust a size of an interface element in this case.

Example 1

Figure 15A:
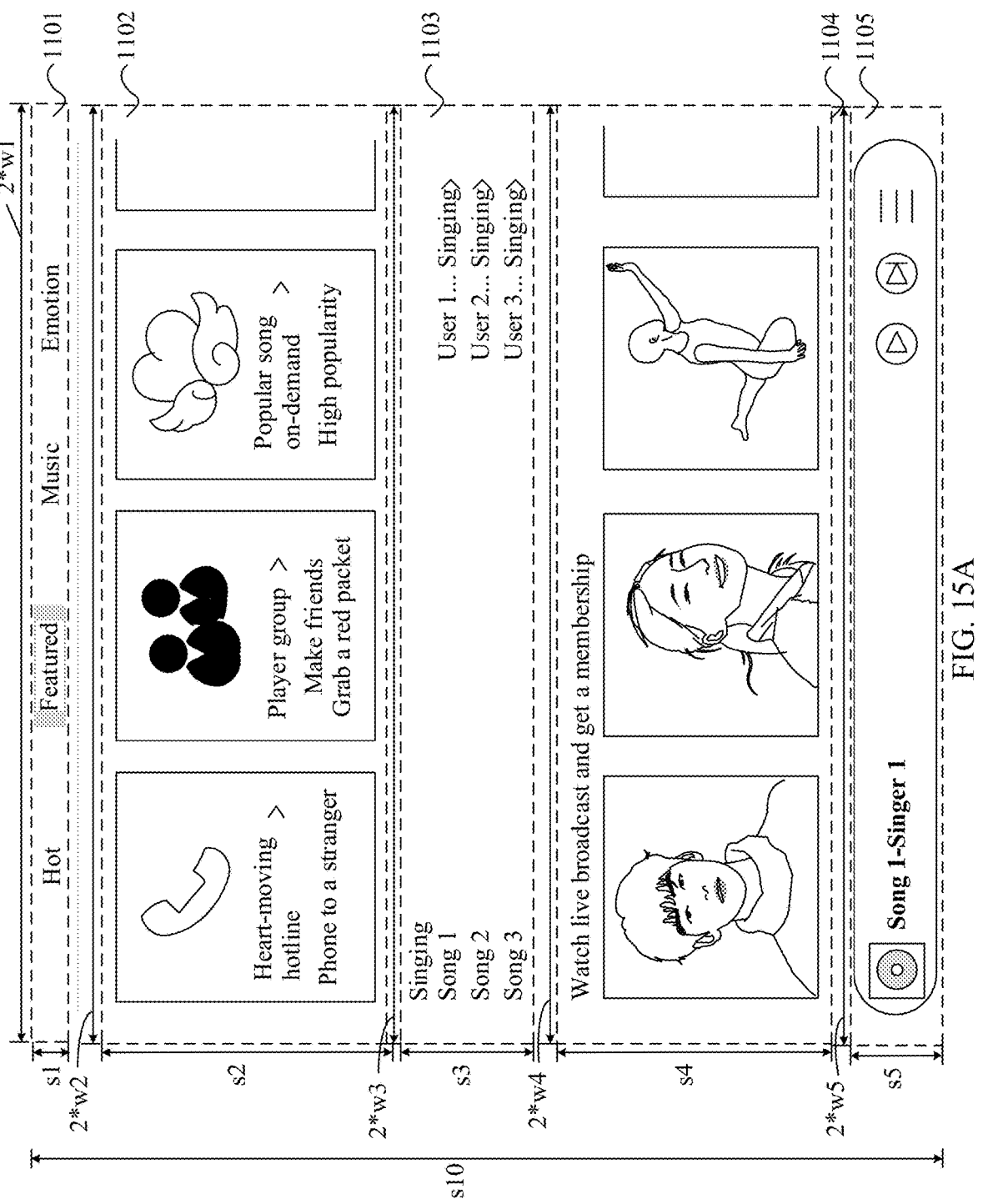
FIG. 15A and FIG. 15B are schematic diagrams of user interfaces integrating a plurality of control layout types according to an embodiment of this application.
Figure 15B:
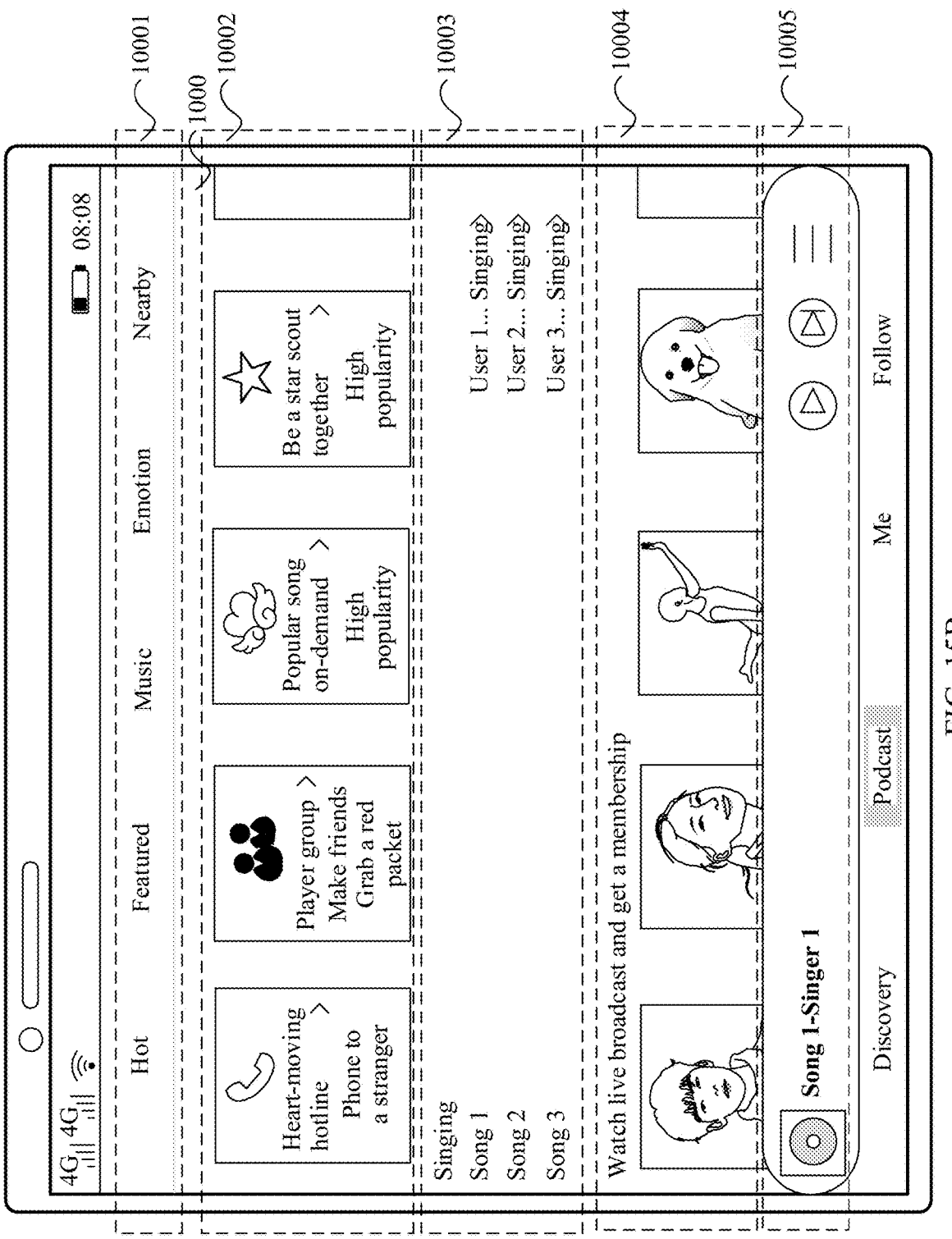

FIG. 3A shows a user interface 500 displayed when an electronic device is in a folded state. FIG. 15B shows a user interface 1000 displayed when an electronic device is unfolded.

As shown in FIG. 3A, the user interface 500 includes a page selection bar 1001, an interaction function bar 1002, a singing bar 1003, a live broadcast bar 1004, and a music playing display bar 1005. Control layout types of the interaction function bar 1002 and the live broadcast bar 1004 may belong to a content grid, and control layout types of the singing bar 1003 and the music playing display bar 1005 may belong to a text type. When the electronic device is switched from the folded state to the unfolded state, sizes of interface elements in the parts of the foregoing different control layout types may be separately adjusted.

The adjustment may be performed in two steps.

First, for an interface element in an interface area (for example, a page selection bar 1101), a width of the interface element may be adjusted based on a width change of a screen first, and then a height of the interface element is adjusted based on a width after adjustment of the interface element, so that an aspect ratio of the interface element remains unchanged or almost unchanged before and after adjustment. The width of the interface element may increase as the width of the screen increases. For example, a width increase proportion of the interface element may be the same as a width increase proportion of the screen.

For example, in the folded state, a screen width is W and a screen height is S. In the unfolded state, a screen width is 2*W and a screen height is S. As shown in FIG. 15A, a width of an interface element in the page selection bar 1101 changes from w1 to 2×w1, and a height changes from s1 to 2*s1. Similarly, a width of an interface element in the interaction function bar 1102 changes from w2 to 2*w2, and a height changes from s2 to 2*s2. A width of an interface element in the singing bar 1103 changes from w3 to 2*w3, and a height changes from s3 to 2*s3. A width of an interface element in the live broadcast bar 1104 changes from w4 to 2*w4, and a height changes from s4 to 2*s4. A width of an interface element in the music playing display bar 1105 changes from w5 to 2*w5, and a height changes from s5 to 2*s5. In this way, after initial adjustment, a total of vertical display space required by all interface elements of the page selection bar 1101, the interaction function bar 1102, the singing bar 1103, the live broadcast bar 1104, and the music playing display bar 1105 on the user interface 510 is as high as S10, which exceeds a screen height, and consequently, some interface elements on the user interface 510 cannot be displayed. For example, as shown in FIG. 3B, the live broadcast bar 1104 is not displayed on an expanded screen because of insufficient vertical display space.

Further, to avoid a problem that an interface is not aesthetic due to an excessively large interface element like a large icon and a large font, a size of the interface element may be further fine-tuned, so as to control a height of the interface element to adapt to a height of the screen. Herein, "adaptation" may mean that the height of the interface element and the height of the screen are within a specific ratio range. For example, in the unfolded state, and an original picture of a photo is browsed, a ratio of a photo height to a screen height is controlled not to exceed 1/2.

For example, if it is determined that a ratio of the height 2*s1 of the interface element in the page selection bar 1101 to the screen height S in the unfolded state is greater than a threshold range, the height of the interface element may be further adjusted to a page selection bar 10001 shown in FIG. 15B. After the adjustment is further completed, the ratio of the height of the interface element to the screen height S is not greater than the threshold range. In this way, the interface elements in the page selection bar 10001 are not very large in the unfolded state. Similarly, in the unfolded state, interface elements in an interaction function bar 10002, a singing bar 10003, a live broadcast bar 10004, a music playing display bar 10005, and the like may also be further adjusted, so as to control that the interface elements in each area are not excessively large.

In addition, because the height of the control interface element is adapted to the height of the screen, a problem of an excessively large interface element does not exist, and it may be further ensured that all interface elements on the user interface 500 shown in FIG. 3A can still be displayed on the screen in the unfolded state.

Example 2

Figure 16A:
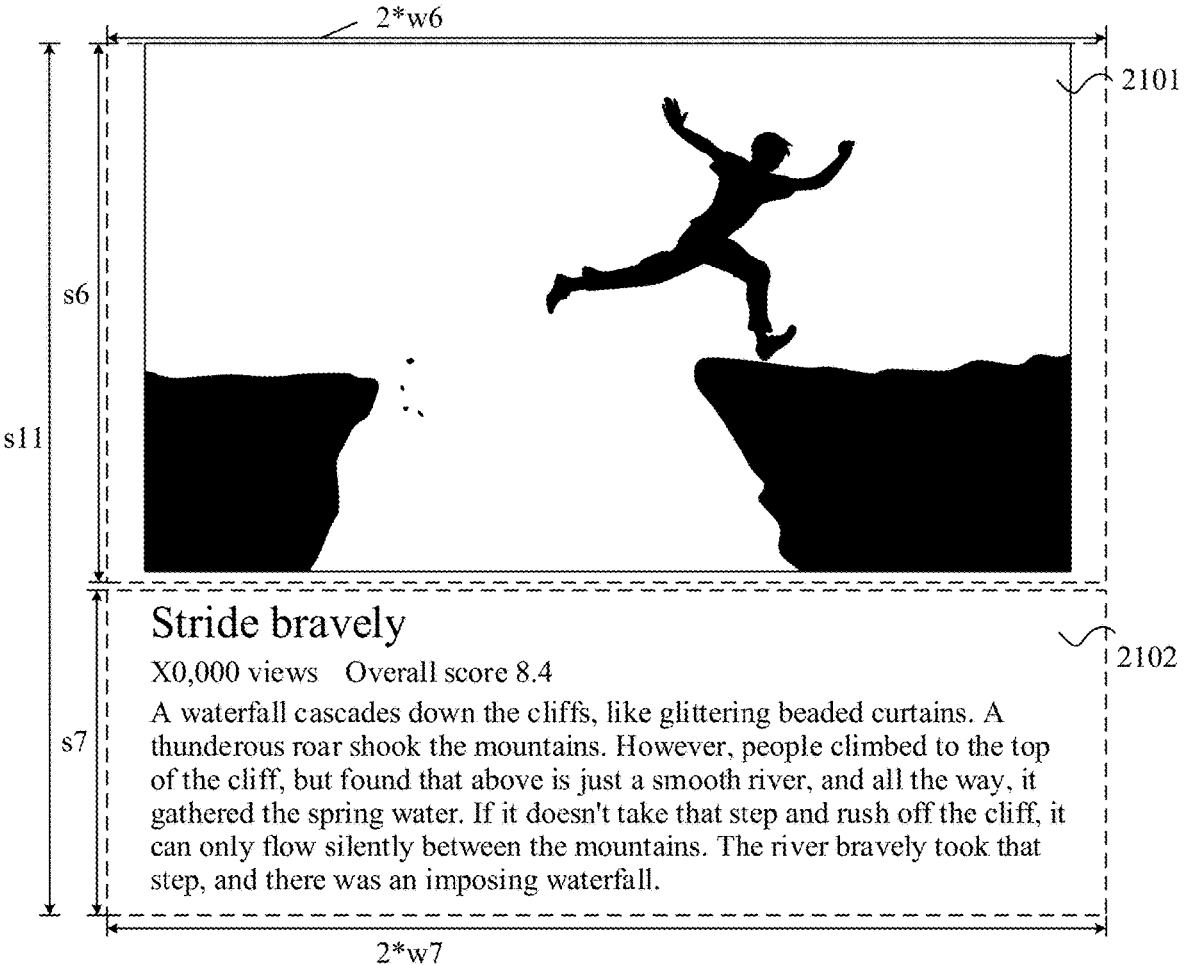
FIG. 16A and FIG. 16B are schematic diagrams of user interfaces integrating another plurality of control layout types according to an embodiment of this application.
Figure 16B:
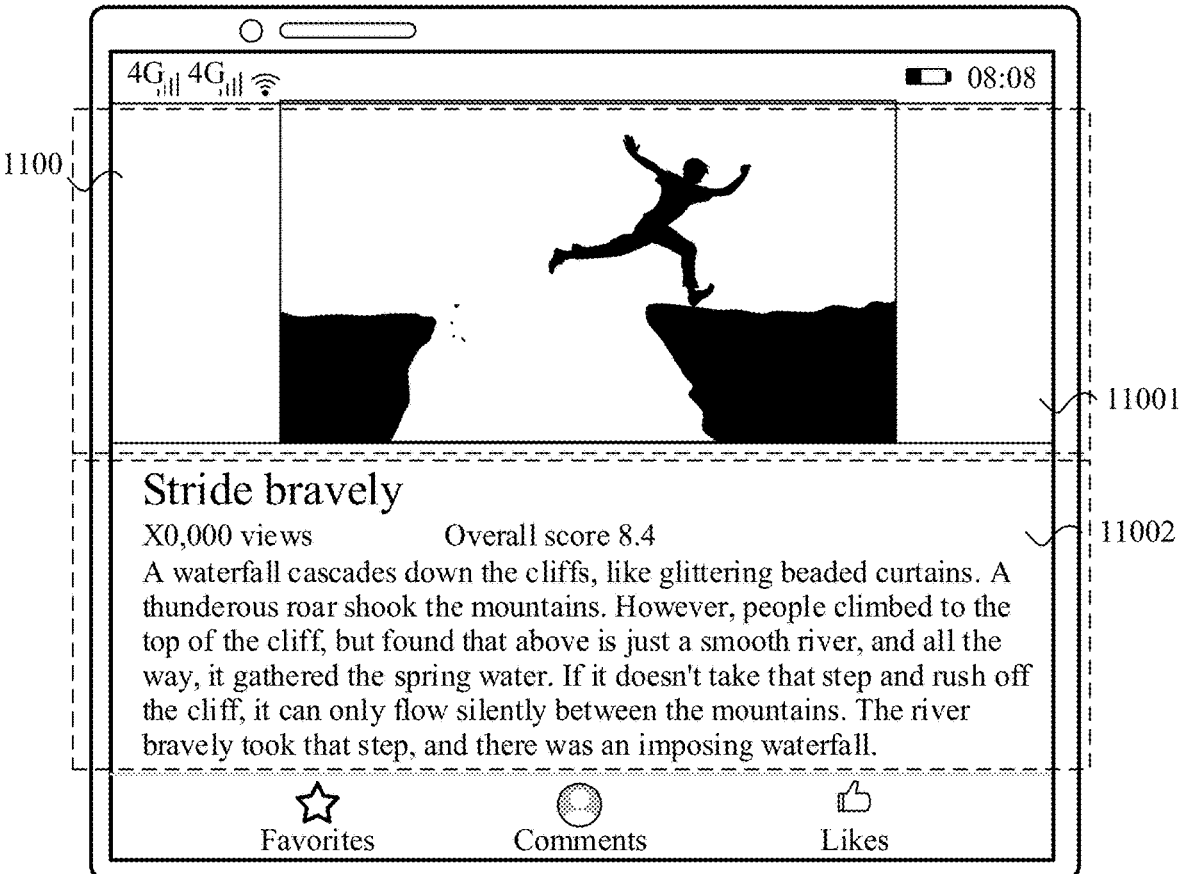

FIG. 4A shows a user interface 600 displayed when an electronic device is in a folded state. FIG. 16B shows a user interface 1100 displayed when an electronic device is unfolded.

As shown in FIG. 3A, the user interface 500 includes a video playing area 2001 and a video introduction area 2002. A control layout type of the video playing area 2001 may be an immersive large image. A control layout type of the video introduction area 2002 may be a text type. When the electronic device is switched from the folded state to the unfolded state, sizes of interface elements in the parts of the foregoing different control layout types may be separately adjusted.

The adjustment may be performed in two steps.

First, for an interface element in an interface area (for example, the video playing area 2001), a width of the interface element may be adjusted based on a width change of a screen first, and then a height of the interface element is adjusted based on a width after adjustment of the interface element, so that an aspect ratio of the interface element remains unchanged or almost unchanged before and after adjustment. The width of the interface element may increase as the width of the screen increases. For example, a width increase proportion of the interface element may be the same as a width increase proportion of the screen.

For example, in the folded state, a screen width is W and a screen height is S. In the unfolded state, a screen width is 2*W and a screen height is S. As shown in FIG. 16A, a width of an interface element in a video playing area 2101 changes from w6 to 2*w6, and a height changes from s6 to 2*s6. Similarly, a width of an interface element in a video introduction area 2102 changes from w7 to 2*w7, and a height changes from s7 to 2*s7. In this way, after initial adjustment, a total of vertical display space required by all interface elements in the video playing area 2101 and the video introduction area 2102 on the user interface 610 is as high as S11, which exceeds a screen height. Consequently, some interface elements on the user interface 610 cannot be displayed. For example, as shown in FIG. 4B, the video introduction area 2102 displays only a part of content on an expanded screen due to insufficient vertical display space.

Further, to avoid a problem that an interface is not aesthetic due to an excessively large interface element like a large icon and a large font, a size of the interface element may be further fine-tuned, so as to control a height of the interface element to adapt to a height of the screen. Herein, "adaptation" may mean that the height of the interface element and the height of the screen are within a specific ratio range. For example, in the unfolded state, and an original picture of a photo is browsed, a ratio of a photo height to a screen height is controlled not to exceed 1/2.

For example, if it is determined that a ratio of the height 2*s6 of the interface element in the video playing area 2101 to the screen height S in the unfolded state is greater than a threshold range, the height of the interface element may be further adjusted to a video playing area 11001 shown in FIG. 16B. After the adjustment is further completed, the ratio of the height of the interface element to the screen height S is not greater than the threshold range. In this way, the interface elements in the video playing area 11001 are not very large in the unfolded state. Similarly, interface elements in a video introduction area 11002 and the like may also be further adjusted, so as to control that the interface elements in each area are not excessively large.

In addition, because the height of the control interface element is adapted to the height of the screen, a problem of an excessively large interface element does not exist, and it may be further ensured that all interface elements on the user interface 600 shown in FIG. 4A can still be displayed on the screen in the unfolded state.

A software system of the electronic device 100 may use a layered architecture, an event-driven architecture, a micro-kernel architecture, a micro service architecture, or a cloud architecture.

In this embodiment of the present invention, an Android system of a layered architecture is used as an example to illustrate the software structure of the electronic device 100.

Figure 17:
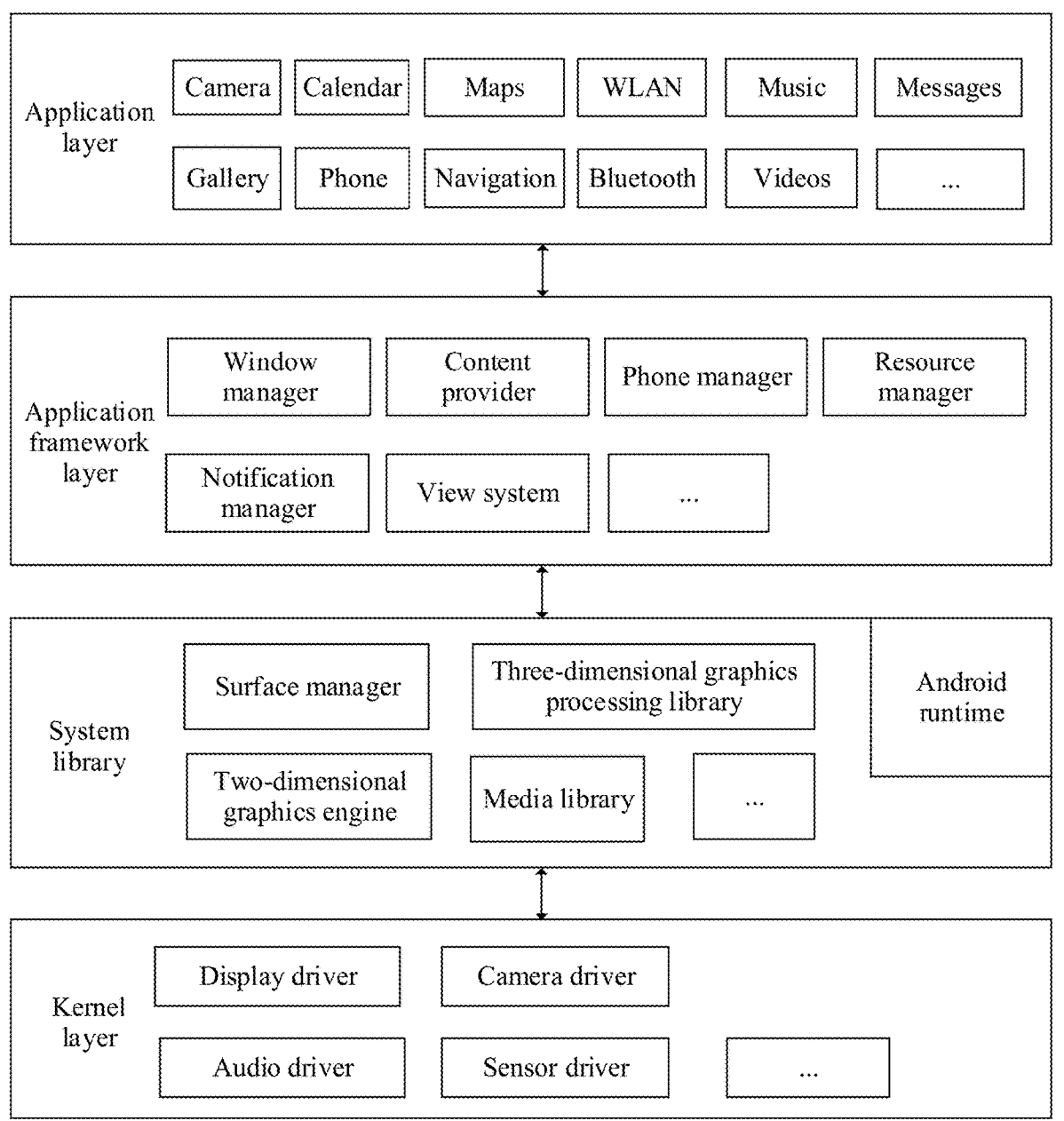
FIG. 17 is a schematic block diagram of a software structure of an electronic device 100 according to an embodiment of this application.

FIG. 17 is a block diagram of a software structure of an electronic device 100 according to an embodiment of the present invention.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 17, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 17, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application program. The data may include a video, an image, audio, calls that are made and answered, a browsing history and bookmarks, an address book, and the like.

The view system includes visual controls such as a control for displaying a text and a control for displaying an image. The view system may be configured to construct an application program. A display interface may include one or more views. For example, a display interface including an SMS message notification icon may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for an application program.

The notification manager enables an application program to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an alert sound is played, the electronic device 100 vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The implementations of this application may be randomly combined, to achieve different technical effects.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (solid state disk, SSD)), or the like.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

In conclusion, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

The invention claimed is:

1. A display method for a foldable screen of an electronic device, the method comprising:
obtaining, by the electronic device, a first height and a first width of an interface element on a first interface when in an unfolded state, wherein the first height and the first width are determined based on a height and a width of the interface element in a folded state of the electronic device;
determining, by the electronic device, whether a ratio of the first height to a screen height is greater than a first threshold;
if the ratio is greater than the first threshold, adjusting the height of the interface element to a second height, wherein a ratio of the second height to the screen height is not greater than the first threshold;
obtaining, by the electronic device, a second width based on the second height; and
displaying, by the electronic device, the first interface in the unfolded state, wherein the displayed first interface comprises the interface element having the second height and the second width.

2. The method according to claim 1, wherein a ratio of the first width to the first height is equal to a ratio of the second width to the second height, or a difference between a ratio of the first width to the first height and a ratio of the second width to the second height is less than a first difference.

3. The method according to claim 2, wherein a control layout type of the first interface is a content grid type, a quantity of images accommodated in one row of the displayed first interface is greater than or equal to a quantity of images accommodated in one row of a set first interface, and a quantity of images accommodated in one column of the displayed first interface is greater than or equal to a quantity of images accommodated in one column of the displayed first interface.

4. The method according to claim 3, wherein the interface element on the first interface comprises a picture or a card, and an arrangement manner of the picture or the card is a grid type.

5. The method according to claim 4, wherein a width of the picture or the card on the set first interface is greater than a width of the picture or the card displayed when the electronic device is in the folded state.

6. The method according to claim 2, wherein a control layout type of the first interface is a large image type providing the set first interface with one photo, a width of the photo being equal to a screen width, or a difference between a width of the photo and a screen width being less than the first difference; and
the width of the photo on the set first interface being less than a width of the photo on the displayed first interface, content of the photo accommodated by the displayed first interface in vertical space being greater than content of the photo accommodated by the set first interface in the vertical space.

7. An electronic device, comprising:
at least one processor; and a memory coupled to the at least one processor and configured to store programming instructions that, when executed by the at least one processor, cause the electronic device to perform operations comprising:

obtaining, a first height and a first width of an interface element on a first interface when in an unfolded state, wherein the first height and the first width are determined based on a height and a width of the interface element in a folded state of the electronic device;

determining whether a ratio of the first height to a screen height is greater than a first threshold;

if the ratio is greater than the first threshold, adjusting the height of the interface element to a second height, wherein a ratio of the second height to the screen height is not greater than the first threshold;

obtaining a second width based on the second height; and displaying the first interface in the unfolded state, wherein the displayed first interface comprises the interface element having the second height and the second width.

8. The electronic device according to claim 7, wherein a ratio of the first width to the first height is equal to a ratio of the second width to the second height, or a difference between a ratio of the first width to the first height and a ratio of the second width to the second height is less than a first difference.

9. The electronic device according to claim 8, wherein a control layout type of the first interface is a content grid type, a quantity of images accommodated in one row of the displayed first interface is greater than or equal to a quantity of images accommodated in one row of a set first interface, and a quantity of images accommodated in one column of the displayed first interface is greater than or equal to a quantity of images accommodated in one column of the displayed first interface.

10. The electronic device according to claim 9, wherein the interface element on the first interface comprises a picture or a card, and an arrangement manner of the picture or the card is a grid type.

11. The electronic device according to claim 10, wherein a width of the picture or the card on the set first interface is greater than a width of the picture or the card displayed when the electronic device is in the folded state.

12. The electronic device according to claim 8, wherein a control layout type of the first interface is a large image type providing the set first interface with one photo, a width of the photo being equal to a screen width, or a difference between a width of the photo and a screen width being less than the first difference; and the width of the photo on the set first interface being less than a width of the photo on the displayed first interface, content of the photo accommodated by the displayed first interface in vertical space being greater than content of the photo accommodated by the set first interface in the vertical space.

13. The electronic device according to claim 8, wherein a width of a photo on the set first interface is greater than a width of the photo displayed when the electronic device is in the folded state.

14. The electronic device according to claim 8, wherein a control layout type of the first interface is a social list type providing at least one social feed displayed on the set first interface.

15. The electronic device according to claim 14, wherein a structure of the social feed provides an upper part of the social feed is text and a lower part of the social feed is a photograph, or an upper part of the social feed is a photograph and a lower part of the social feed is text.

16. The electronic device according to claim 15, wherein when the social feed comprises only one photo, a width of the photo on the displayed first interface is less than a width of the photo on the set first interface, and content of the photo accommodated by the displayed first interface in vertical space is greater than content of the photo accommodated by the set first interface in the vertical space.

17. The electronic device according to claim 15, wherein when the social feed comprises a plurality of photos, a quantity of photos accommodated in one row of the displayed first interface is greater than a quantity of photos accommodated in one row of the set first interface, and a quantity of photos accommodated in one column of the displayed first interface is greater than a quantity of photos accommodated in one column of the set first interface.

18. The electronic device according to claim 15, wherein a width of the photo on the set first interface is greater than a width of the photo displayed when the electronic device is in the folded state.

19. The electronic device according to claim 8, wherein a control layout type of the first interface is a text list type providing display of text on the set first interface, wherein a text font of the displayed first interface is smaller than a text font of the set first interface.

20. A non-transitory computer readable medium configured to store instructions that, when executed by at least one processor of an electronic device, cause the electronic device to perform operations comprising:

obtaining, a first height and a first width of an interface element on a first interface when\ in an unfolded state, wherein the first height and the first width are determined based on a height and a width of the interface element in a folded state of the electronic device;

determining whether a ratio of the first height to a screen height is greater than a first threshold;

if the ratio is greater than the first threshold, adjusting the height of the interface element to a second height, wherein a ratio of the second height to the screen height is not greater than the first threshold;

obtaining a second width based on the second height; and displaying the first interface in the unfolded state, wherein the displayed first interface comprises the interface element having the second height and the second width.

* * * * *